(12) United States Patent
Furusho

(10) Patent No.: US 7,882,114 B2
(45) Date of Patent: Feb. 1, 2011

(54) DATA PROCESSING METHOD AND DATA PROCESSING PROGRAM

(75) Inventor: Shinji Furusho, Yokohama (JP)

(73) Assignee: Turbo Data Laboratories, Inc., Kanagawa (JP)

( * ) Notice: Subject to any disclaimer, the term of this patent is extended or adjusted under 35 U.S.C. 154(b) by 670 days.

(21) Appl. No.: 10/532,492

(22) PCT Filed: Oct. 23, 2003

(86) PCT No.: PCT/JP03/13559

§ 371 (c)(1),
(2), (4) Date: Feb. 3, 2006

(87) PCT Pub. No.: WO2004/038582

PCT Pub. Date: May 6, 2004

(65) Prior Publication Data

US 2006/0218154 A1 Sep. 28, 2006

(30) Foreign Application Priority Data

Oct. 25, 2002 (JP) .............................. 2002-310618

(51) Int. Cl.
*G06F 7/00* (2006.01)
*G06F 17/30* (2006.01)
(52) U.S. Cl. ...................................... 707/752; 707/756
(58) Field of Classification Search .................. 707/100, 707/101, 102, 7, 2, 1, 736, 737, 752, 756; 710/54
See application file for complete search history.

(56) References Cited

U.S. PATENT DOCUMENTS 6,032,207 A 2/2000 Wilson 6,721,751 B1 4/2004 Furusho (Continued)

FOREIGN PATENT DOCUMENTS

EP 1191462 A1 * 3/2002

(Continued)

OTHER PUBLICATIONS

International Search report in corresponding International Application No. PCT/JP03/13559 dated Jan. 21, 2004 and mailed Feb. 3, 2004.

(Continued)

*Primary Examiner*—James Trujillo
*Assistant Examiner*—Marc Somers
(74) *Attorney, Agent, or Firm*—Griffin & Szipl, P.C.

(57) ABSTRACT

Table-formatted data is divided into information blocks, each including a value list where item values are arranged in order of item value number corresponding to the item value of each item, and a pointer array where pointer values, each indicate an item value number, are arranged in order of unique record number. A part of records is selected as a subset, and in response to the selection, an ordered set array including the record numbers of the subset is created. Each record number in the ordered set array indicates the position of one of the pointer values in the pointer array, which are arranged in the item value number array correspondingly to positions where the record numbers are arrayed. With reference to values in the item value number array, a second pointer array wherein position elements are arranged, and a second value list wherein value elements are arranged, are generated.

10 Claims, 45 Drawing Sheets

FOREIGN PATENT DOCUMENTS

| | | |
|---|---|---|
| JP | 2000-339390 | 12/2000 |
| JP | 2000339390 | * 12/2000 |
| JP | 2001-043290 | 2/2001 |
| JP | 2002-169689 | 6/2002 |
| WO | WO 00/10103 | 2/2000 |
| WO | 00/73939 A1 | 12/2000 |

OTHER PUBLICATIONS

Delphion Integrated View of US6721751, issued Apr. 13, 2004, labeled "Exhibit A" and printed Dec. 12, 2008.

* cited by examiner

| | MEMBER NAME | AREA | FAN |
|---|---|---|---|
| 0 | Greene | Tokyo | G-Team |
| 1 | Bernstein | S-Chiba | G-Team |
| 2 | Carter | Tokyo | T-Team |
| 3 | Wilson | S-Chiba | B-Team |
| 4 | Bush | Kanagawa | B-Team |
| 5 | Eliot | Kyoto | T-Team |
| 6 | Hilton | Kanagawa | B-Team |
| 7 | Jackson | E-Osaka | T-Team |
| 8 | Smith | Aichi | D-Team |
| 9 | Fitzgerald | Tokyo | G-Team |

101

| 0 | 1 | 2 | 3 | 4 | 5 | 6 | 7 | 8 | 9 |
|---|---|---|---|---|---|---|---|---|---|
| 0 | 1 | 2 | 3 | 4 | 5 | 6 | 7 | 8 | 9 |

100

(b)

| | MEMBER NAME | AREA | FAN |
|---|---|---|---|
| 0 | Greene | Tokyo | G-Team |
| 2 | Carter | Tokyo | T-Team |
| 9 | Wilson | Tokyo | G-Team |

| 0 | 2 | 9 |
|---|---|---|
| 0 | 1 | 2 |

Fig.2

(a) MEMBER NAME

| | |
|---|---|
| 0 | Bernstein |
| 1 | Bush |
| 2 | Carter |
| 3 | Eliot |
| 4 | Fitzgerald |
| 5 | Greene |
| 6 | Hilton |
| 7 | Jackson |
| 8 | Smith |
| 9 | Wilson |

| | |
|---|---|
| 0 | 5 |
| 1 | 0 |
| 2 | 2 |
| 3 | 9 |
| 4 | 1 |
| 5 | 3 |
| 6 | 6 |
| 7 | 7 |
| 8 | 8 |
| 9 | 4 |

211, 201, 212

(b) AREA

| | |
|---|---|
| 0 | Aichi |
| 1 | E-Osaka |
| 2 | Kanagawa |
| 3 | Kyoto |
| 4 | S-Chiba |
| 5 | Tokyo |

| | |
|---|---|
| 0 | 5 |
| 1 | 4 |
| 2 | 5 |
| 3 | 4 |
| 4 | 2 |
| 5 | 3 |
| 6 | 2 |
| 7 | 1 |
| 8 | 0 |
| 9 | 5 |

202

(c) FAN

| | |
|---|---|
| 0 | B-Team |
| 1 | D-Team |
| 2 | G-Team |
| 3 | T-Team |

| | |
|---|---|
| 0 | 2 |
| 1 | 2 |
| 2 | 3 |
| 3 | 0 |
| 4 | 0 |
| 5 | 3 |
| 6 | 0 |
| 7 | 3 |
| 8 | 1 |
| 9 | 2 |

203

Fig.8
(a)
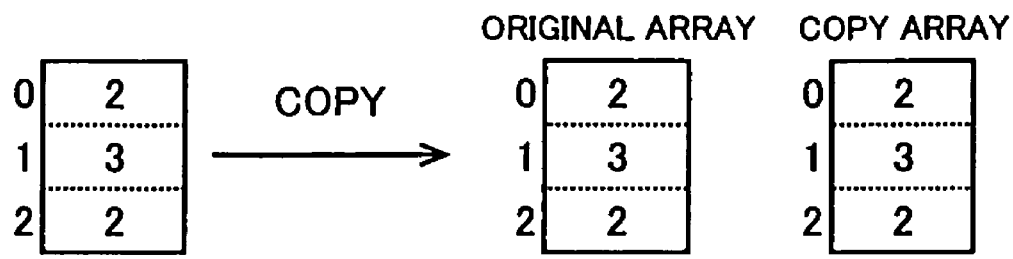
(b)
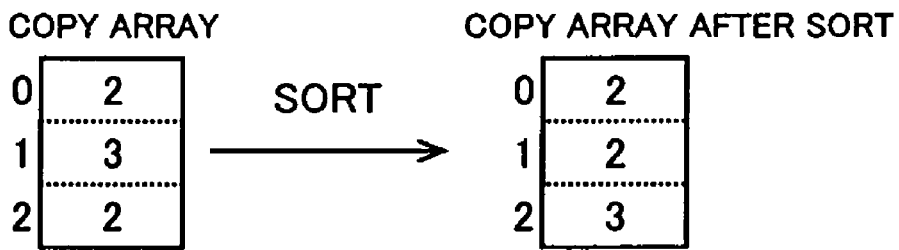
(c)
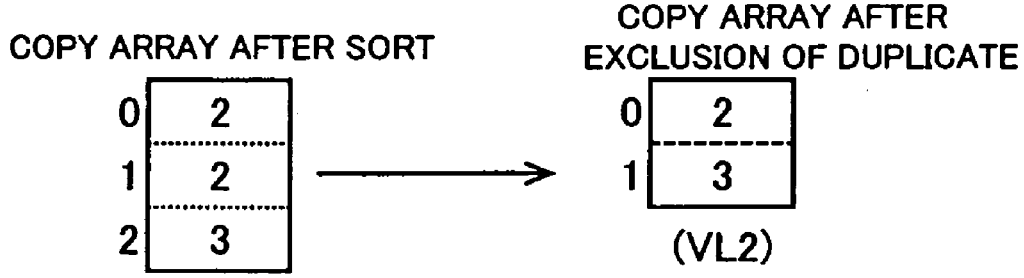
(d)
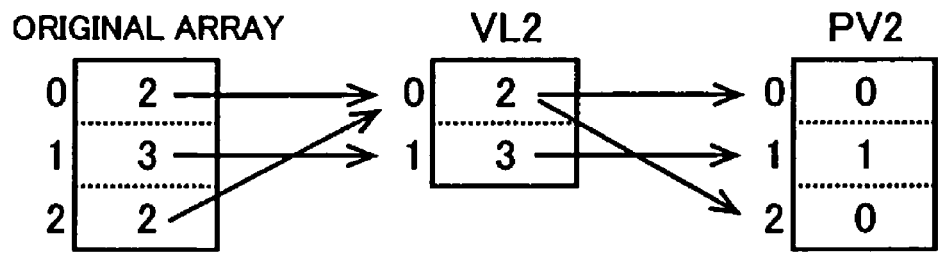

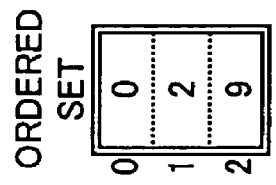
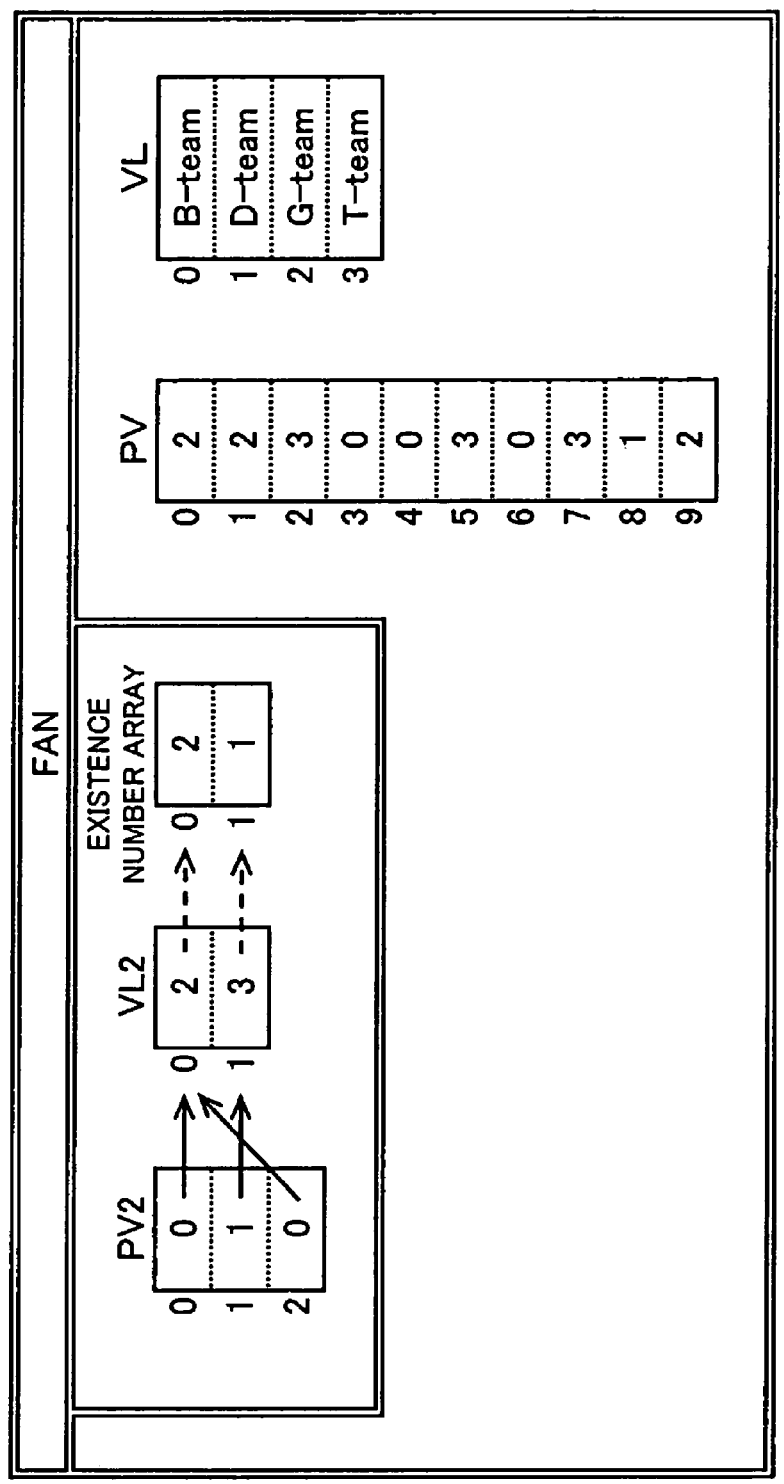

Fig.21

MASTER SIDE

| MEMBER NAME | AREA | FAN |
|---|---|---|
| Greene | Tokyo | G-team |
| Greene | Tokyo | G-team |
| Carter | Tokyo | T-team |
| Fitzgerald | Tokyo | G-team |
| Fitzgerald | Tokyo | G-team |

2101

SLAVE SIDE

| BASEBALL TEAM | GAME DAY | BASEBALL FIELD |
|---|---|---|
| G-team | MAY 10 | Tokyo |
| G-team | MAY 11 | Tokyo |
| T-team | MAY 10 | Tokyo |
| G-team | MAY 10 | Tokyo |
| G-team | MAY 11 | Tokyo |

BASEBALL FIELD

| PV | |
|---|---|
| 0 | 0 |
| 1 | 1 |
| 2 | 2 |
| 3 | 1 |
| 4 | 0 |
| 5 | 2 |
| 6 | 3 |
| 7 | 2 |
| 8 | 2 |
| 9 | 0 |
| 10 | 0 |
| 11 | 3 |

| | VL |
|---|---|
| 0 | Tokyo |
| 1 | U-Nagoya |
| 2 | V-Hiroshima |
| 3 | Yokohama |

GAME DAY

| PV | |
|---|---|
| 0 | 0 |
| 1 | 0 |
| 2 | 0 |
| 3 | 0 |
| 4 | 0 |
| 5 | 0 |
| 6 | 1 |
| 7 | 1 |
| 8 | 1 |
| 9 | 1 |
| 10 | 1 |
| 11 | 1 |

| | VL |
|---|---|
| 0 | MAY 10 |
| 1 | MAY 11 |

BASEBALL TEAM

| PV | |
|---|---|
| 0 | 5 |
| 1 | 4 |
| 2 | 1 |
| 3 | 2 |
| 4 | 3 |
| 5 | 0 |
| 6 | 5 |
| 7 | 4 |
| 8 | 1 |
| 9 | 2 |
| 10 | 3 |
| 11 | 0 |

| | VL |
|---|---|
| 0 | B-team |
| 1 | C-team |
| 2 | D-team |
| 3 | G-team |
| 4 | S-team |
| 5 | T-team |

Fig.30

FAN

ORDERED SET

| | |
|---|---|
| 0 | 0 |
| 1 | 2 |
| 2 | 9 |

PV2

| | |
|---|---|
| 0 | 0 |
| 1 | 1 |
| 2 | 0 |

NEW VL2

| | |
|---|---|
| 0 | |
| 1 | 1 |
| 2 | 2 |

PV

| | |
|---|---|
| 0 | 2 |
| 1 | 2 |
| 2 | 3 |
| 3 | 0 |
| 4 | 0 |
| ... | ... |
| 9 | 2 |

VL

| | |
|---|---|
| 0 | B-team |
| 1 | D-team |
| 2 | G-team |
| 3 | T-team |

BASEBALL TEAM

ORDERED SET

| | |
|---|---|
| 0 | 0 |
| 1 | 4 |
| 2 | 9 |
| 3 | 10 |

PV2

| | |
|---|---|
| 0 | 2 |
| 1 | 1 |
| 2 | 0 |
| 3 | 1 |

NEW VL2

| | |
|---|---|
| 0 | 0 |
| 1 | 1 |
| 2 | 2 |

PV

| | |
|---|---|
| 0 | 5 |
| 1 | 4 |
| 2 | 1 |
| 3 | 2 |
| 4 | 3 |
| 5 | 0 |
| ... | ... |
| 11 | 0 |

VL

| | |
|---|---|
| 0 | B-team |
| 1 | C-team |
| 2 | D-team |
| 3 | G-team |
| 4 | S-team |
| 5 | T-team |

DATA PROCESSING METHOD AND DATA PROCESSING PROGRAM

This is a National Phase Application in the United States of International Patent Application No. PCT/JP03/013559, filed Oct. 23, 2003, which claims priority on Japanese Patent Application No. 2002-310618, filed Oct. 25, 2002. The entire disclosures of the above patent applications are hereby incorporated by reference.

TECHNICAL FIELD TO WHICH THE INVENTION BELONGS

The present invention relates to a method for efficiently processing a subset of tabular format data and to a program.

BACKGROUND ART

It takes much time to retrieve, aggregate or sort a large amount of data such as a database, or to join or update these data. In order to solve this, the present inventor has proposed a method for retrieving, aggregating and sorting tabular format data at very high speed and a method for joining or updating tabular format data or performing transaction processing (for example, see International Publication No. WO00/10103, JP-A-2000-339390, and JP-A-2001-043290).

A series of methods disclosed in these documents are innovative in that no index is used, a unified processing can be performed, and the processing can be performed even for a subset without lowering the efficiency.

Tabular format data originated with the present inventor has a data structure as described below. FIG. 1(a) is a view showing an example of the tabular format data. In this example, each of record numbers in an array 100 storing the record numbers is made to correspond to values (item values) of items of "member name", "area" and "fan" (see reference numeral 101). The data structure originated with the present inventor holds the tabular format data as shown in FIG. 1(a) in a format as shown in FIGS. 2(a) to 2(c).

For example, as shown in FIG. 2(a), with respect to the item "member name", there are provided a value list (hereinafter referred to as "VL" in some cases) 211 in which the item values are sorted in the order of the kana syllabary (alphabetical order in English letters) and a pointer array (hereinafter referred to as "PV" in some cases) 212 for the value list, which stores numbers corresponding to the respective record numbers and indicating element positions in the value list 211 indicated by the record numbers. As stated above, with respect to a certain item, an array group including a pointer array and a value list and including, in addition to these, one or more accompanying arrays in some cases is referred to as an information block (see reference numeral 201). As is understood from FIG. 2(a), the pointer array contains elements the number of which is equal to the number of records of the tabular format data. Also with respect to the item "area", an information block 202 includes a PV and a VL, and similarly, also with respect to the item "fan", an information block 203 includes a PV and a VL.

When attention is paid to the record number "0", since the value of the PV in the information block 201 is "5", the item value "Green" in the VL, the storage position of which is "5", is specified. Similarly, since the values of the PVs of the information blocks 202 and 203 are "5" and "2", respectively, the item values "Tokyo" and "G-Team" at the corresponding storage position numbers are specified. It would be understood that these correspond to the item values contained in the record number "0" in FIG. 1(a).

Retrieval, aggregation, sort and join are performed using the data structure as stated above, so that a remarkably high processing is realized.

However, in the processing of retrieval or the like using the above data structure, it has been recognized that following problems can arise.

Even in the case where a small number of subsets are made a processing object among all records, and a desired record is retrieved from the subsets, according to the method originated with the present applicant, an array having the same size as the VL is provided, and as an element of the array, a flag indicating whether or not it is contained in the range of values to be retrieved is arranged. Similarly, an array having the same size as the value list is required for pass/fail judgment of the retrieval.

Also at the time of sorting or aggregating, one or more arrays having the same size as the value list are required. Further, also at the time of join processing, it is necessary to provide various arrays having the same size as the value list.

Accordingly, even in the case where the processing of retrieval, aggregation, sort and join is performed while a very small number of subsets are made a processing object from a remarkably large number of records, when a large value list is provided in an information block, a large memory area for an array required for the processing is needed. Besides, a processing of arranging values in the array, a processing of scanning the values, and the like are required. Thus, there has been a problem that as compared with the case where all the records are made a processing object, although a processing object is small, the processing time can not be correspondingly shortened.

The invention has an object to provide a method of realizing the shortening of a processing time corresponding to the size of a subset by causing the array to coincide with the size of the subset or the size of a subset of a value list limited in accordance with this.

DISCLOSURE OF THE INVENTION

The object of the invention is achieved by a data processing method for extracting a subset as a processing object from a tabular format data expressed as an array of records each including an item and an item value belonging to the item, the data processing method including a) a step of constructing the tabular format data by dividing it into information blocks each including a value list in which item values are stored in order of item value numbers corresponding to the item values belonging to a specific item and a pointer array in which pointer values to indicate the item value numbers are stored in order of unique record numbers, b) a step of creating, in response to selection of a subset as a part of the records, an ordered set array containing recording numbers of the subset, c) a step of arranging a pointer value in the pointer array at a position indicated by each of the record numbers of the ordered set into an item value number array correspondingly to the position where the record number is arranged, and d) a step of creating a second pointer array storing position elements and a second value list storing value elements by referring to the value in the item value number array, and wherein a value in the value list is specified from a record number of the ordered set array through an element in the second pointer array at a position indicted by the record number and an element in the second value list at a position indicated by the element in the second pointer array.

According to the invention, the second value list indicating the item value of the value list relevant to the record number constituting the subset is created, and data processing (retrieval, aggregation, sort, and join processing as described later) can be performed by referring to the second value list. Accordingly, since the amount of data to which reference is made can be made small, the processing time can be shortened. Besides, since the size of the array created at the data processing can also be made the same as the second value list or the second pointer array, it becomes possible to reduce the memory area required.

In a preferred embodiment, the step of creating the second pointer array and the second value list includes a step of sorting the elements in the item value number array, creating an array in a state where a duplicate value is excluded, and making this the second value list, and a step of creating the second pointer array by converting the elements in the item value number array to reflect the sort and the exclusion of the duplicate value.

Besides, in another preferred embodiment, a data processing method for extracting a subset as a processing object from a tabular format data expressed as an array of records each including an item and an item value belonging to the item, includes a) a step of constructing the tabular format data by dividing it into information blocks each including a value list in which item values are stored in order of item value numbers correspondingly to the item values belonging to a specific item and a pointer array in which pointer values to indicate the item value numbers are stored in order of unique record numbers, b) a step of creating, in response to selection of a subset as a part of the records, an ordered set array containing recording numbers of the subset, c) a step of arranging a pointer value in the pointer array at a position indicated by each of the record numbers of the ordered set into an item value number array correspondingly to the position where the record number is arranged, and e) a step of using the item value number array as a second value list and using the original value list as a second value list, wherein a value in the value list is specified from a record number of the ordered set array through an element in the second pointer array at a position indicted by the record number and an element in the second value list at a position indicated by the element in the second pointer array.

In this embodiment, since the second value list is the original value list, its size can not be reduced. However, the item value number array having the same size as the ordered set array is used as the second pointer array. Accordingly, as compared with the case where the original pointer array and the original value list are used, the amount of data to which reference is made can be made small, and it becomes possible to shorten the processing time.

A preferred embodiment further includes a step of comparing a size of the ordered set array with a size of the value list, and as a result of the comparison, in a case where the size of the subset is smaller than the size of the value list at a predetermined rate, the steps c) and d) or the steps c) and e) are performed.

Here, in the case where the shortening of the processing time is recognized even when consideration is given to the processing time for creation of the second pointer array and the second value list, the second pointer array and the second value list are created, and the processing using these is performed. The predetermined rate is determined by, for example, (size of the subset, that is, the number of records)/(size of the value list, that is, the number of records)=1/n (n is a number larger than 1). The number "n" may be determined through the input of a desired number by an operator, or may be determined to be a predetermined number in advance.

Besides, the object of the invention is achieved by a retrieval method using the second pointer array and/or the second value list created by the above data processing method, the method characterized by including a step of specifying an element indicating an item value as a retrieval object among elements in the second value list, a step of arraying a value indicating that a flag is on at a position corresponding to a position of the specified element in a flag array having the same size as the second value list, a step of specifying an element of the second pointer array indicated by a record number in the ordered set, a step of referring to a state of a flag in the flag array at a position indicated by an element of the second pointer array, and a step of successively arranging the record number into a newly provided ordered set array for output in a case where the state of the flag is on.

In another embodiment, an aggregation method using the second pointer array and/or the second value list created by the above data processing method includes a step of creating a classification number array in which a classification number indicating a category of a value is arranged correspondingly to an element of the second value list, a step of specifying a record number in the ordered set array corresponding to the specified classification number, and a step of performing aggregation using a predetermined value list item value indicated by the specified record number.

Further, in another embodiment, a sort method using the second pointer array and/or the second value list created by the above data processing method includes a step of calculating an existence number as the number of elements indicated by the second pointer array for each value of the second value list, a step of creating, based on the existence number, a cumulative number array corresponding to a value of the second value list and indicating a head position at which a record number in the ordered set array is to be arranged, and a step of referring to the cumulative array and arranging a record number of the ordered set array into an array for output so that a sort order of the item values in the value list is reflected.

Besides, in another embodiment, a method of joining tabular format data by using the second pointer array and/or the second value list in the information block relating to each of plural tabular format data created by the above data processing method includes a step of finding an item to be shared in each of the plural tabular format data, a step of equating item values in the second value list of the information block relating to the item, and a step of updating an element in the second pointer array in each of the information blocks in response to equating the item values in accordance with a change in arrangement of the item value.

Further, the object of the present invention is achieved by a data processing program for operating a computer to extract a subset as a processing object from a tabular format data expressed as an array of records each including an item and an item value belonging to the item, causes the computer to execute a) a step of constructing the tabular format data by dividing it into information blocks each including a value list in which item values are stored in order of item value numbers correspondingly to the item values belonging to a specific item and a pointer array in which pointer values to indicate the item value numbers are stored in order of unique record numbers, b) a step of creating, in response to selection of a subset as a part of the records, an ordered set array containing recording numbers of the subset, c) a step of arranging a pointer value in the pointer array at a position indicated by each of the record numbers of the ordered set into an item value number array correspondingly to the position where the record number is arranged, and d) a step of creating a second pointer array storing position elements and a second value list storing value elements by referring to the value in the item value number array, and wherein the computer is operated to specify a value in the value list from a record number of the ordered set array through an element in the second pointer array at a position indicted by the record number and an element in the second value list at a position indicated by the element in the second pointer array.

In a preferred embodiment, in the step of creating the second pointer array and the second value list, the computer is made to execute a step of sorting the elements in the item value number array, creating an array in a state where a duplicate value is excluded, and making this the second value list, and a step of creating the second pointer array by converting the elements in the item value number array to reflect the sort and the exclusion of the duplicate value.

Besides, in another preferred embodiment, a data processing program for operating a computer to extract a subset as a processing object from a tabular format data expressed as an array of records each including an item and an item value belonging to the item, causes the computer to execute a) a step of constructing the tabular format data by dividing it into information blocks each including a value list in which item values are stored in order of item value numbers corresponding to the item values belonging to a specific item and a pointer array in which pointer values to indicate the item value numbers are stored in order of unique record numbers, b) a step of creating, in response to selection of a subset as a part of the records, an ordered set array containing recording numbers of the subset, c) a step of arranging a pointer value in the pointer array at a position indicated by each of the record numbers of the ordered set into an item value number array correspondingly to the position where the record number is arranged, and e) a step of using the item value number array as a second value list and using the original value list as a second value list, and causes the computer to operate such that a value in the value list is specified from a record number of the ordered set array through an element in the second pointer array at a position indicted by the record number and an element in the second value list at a position indicated by the element in the second pointer array.

Preferably, the computer is made to further execute a step of comparing a size of the ordered set array with a size of the value list, and as a result of the comparison, in a case where the size of the subset is smaller than the size of the value list at a predetermined rate, the computer is made to execute the steps c) and d) or the steps c) and e).

Incidentally, in the present specification, although a numerical value contained in various arrays is referred to as an "element" or a "value", these are merely different in expression, and there is no essential difference. For example, what is contained in a "value list" is expressed as an "item value", and it is clear that this is also an "element" in the value list.

BRIEF DESCRIPTION OF THE DRAWINGS

The object of the invention and the other objects would become more apparent by referring to embodiments as well as the attached drawings. Here, FIG. 1 is a view showing an example of tabular format data and an example of its subset.

FIG. 2 is a view showing an example of an information block based on the tabular format data of FIG. 1.

FIG. 8 is a view for explaining the compile processing of the embodiment.

FIG. 12 is a view for explaining the retrieval processing of the embodiment.

FIG. 21 is a view showing an example of a joined table (view) in the embodiment.

FIG. 22 is a view showing an information block based on tabular format data to be joined in the embodiment.

FIG. 30 is a view for explaining the join processing of the embodiment.

DESCRIPTION OF THE PREFERRED EMBODIMENTS OF THE INVENTION

Figure 3:
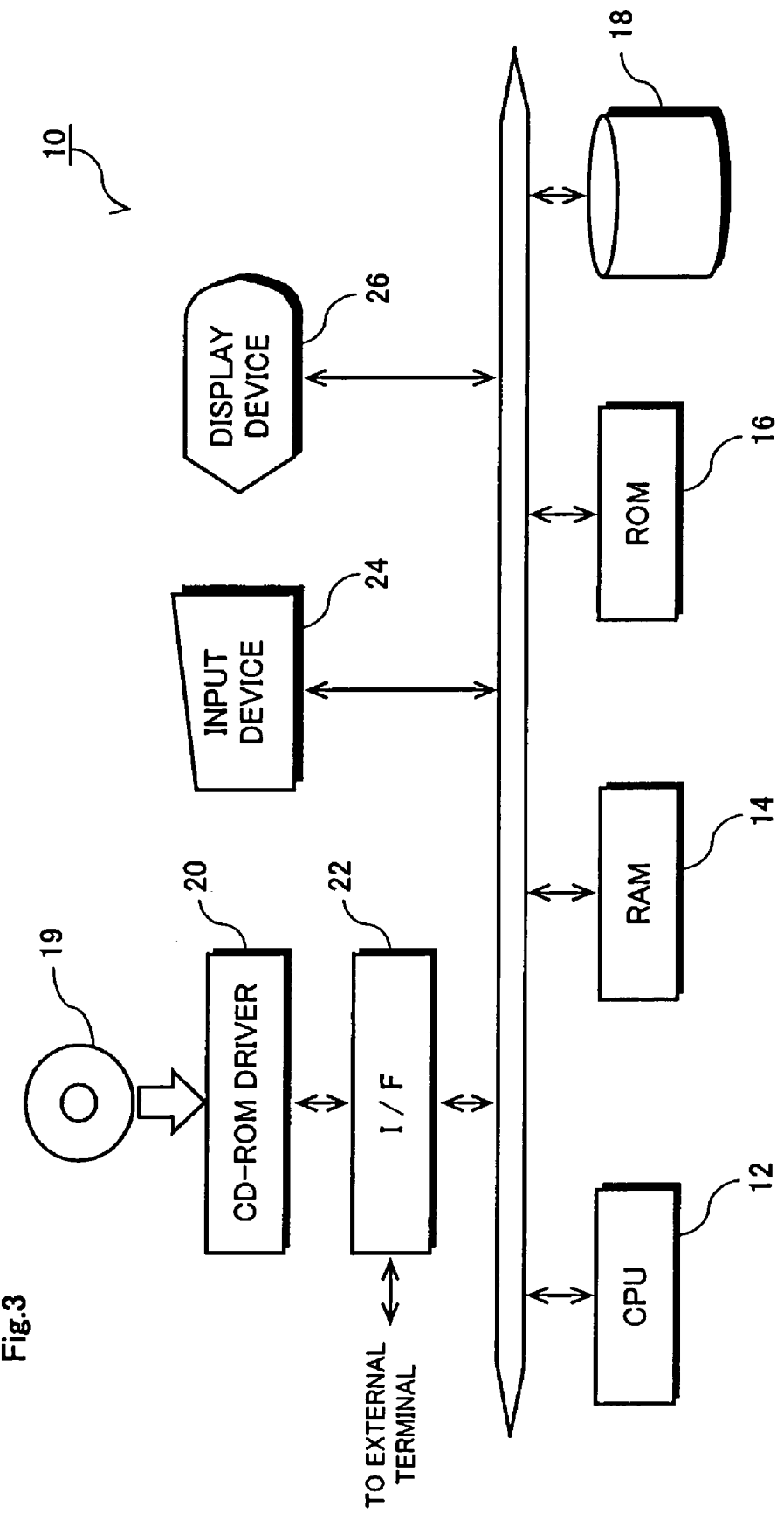
FIG. 3 is a view showing a hardware structure of a computer system for executing a program to realize a processing of an embodiment of the invention.

Hereinafter, embodiments of the invention will be described with reference to the accompanying drawings. FIG. 3 is a block diagram showing a hardware structure of a computer system to realize processing of creating a conversion array for a subset as a processing object in tabular format data according to an embodiment of the invention, and processing of retrieval, aggregation, sort and join. In this embodiment, prior to the processing of retrieval, aggregation, sort and join, with reference to information blocks as shown in FIGS. 2(a) to 2(c), an array including only records and elements of a value list, which become a processing object, is created. This processing is referred to as "preliminary processing". Next, the array created by the preliminary processing is made a working area, and various processings of retrieval, aggregation and the like are performed.

As shown in FIG. 3, this computer system 10 has a same structure as a normal one, and includes a CPU 12 to control the whole system and individual structural portions by executing a program, a RAM (Random Access Memory) 14 for storing work data and the like, a ROM (Read Only Memory) 16 for storing the program and the like, a fixed storage medium 18 such as a hard disk, a CD-ROM driver 20 for accessing a CD-ROM 19, an interface (I/F) 22 provided between the CD-ROM driver 20 and an external terminal connected to an external network (not shown), an input device 24 including a keyboard and a mouse, and a CRT display device 26. The CPU 12, the RAM 14, the ROM 16, the external storage medium 18, the I/F 22, the input device 24, and the display device 26 are mutually connected through a bus 28.

A preprocessing program, and programs of retrieval, aggregation, sort, join and the like according to the embodiment are contained in the CD-ROM 19, and may be read by the CD-ROM driver 20, or may be previously stored in the ROM 16. Besides, what is once read out of the CD-ROM 19 may be stored in a predetermined area of the external storage medium 18. Alternatively, the program may be supplied from the outside through a network (not shown), an external terminal and the I/F 22.

Besides, in the embodiment, in order to realize the preprocessing, and the processing of high speed retrieval, aggregation, sort and join, it is necessary to create an information block of a data format shown in FIGS. 2(a) to 2(c). An information block creation program may also be contained in the CD-ROM 19, stored in the ROM 16, or stored in the external storage medium 18. Alternatively, it is needless to say that these programs may be supplied from the outside through the network (not shown). Besides, in the embodiment, data (information block) created by the information block creation program is stored in the RAM 14, or is stored in a predetermined area of the external storage medium 18.

Figure 4:
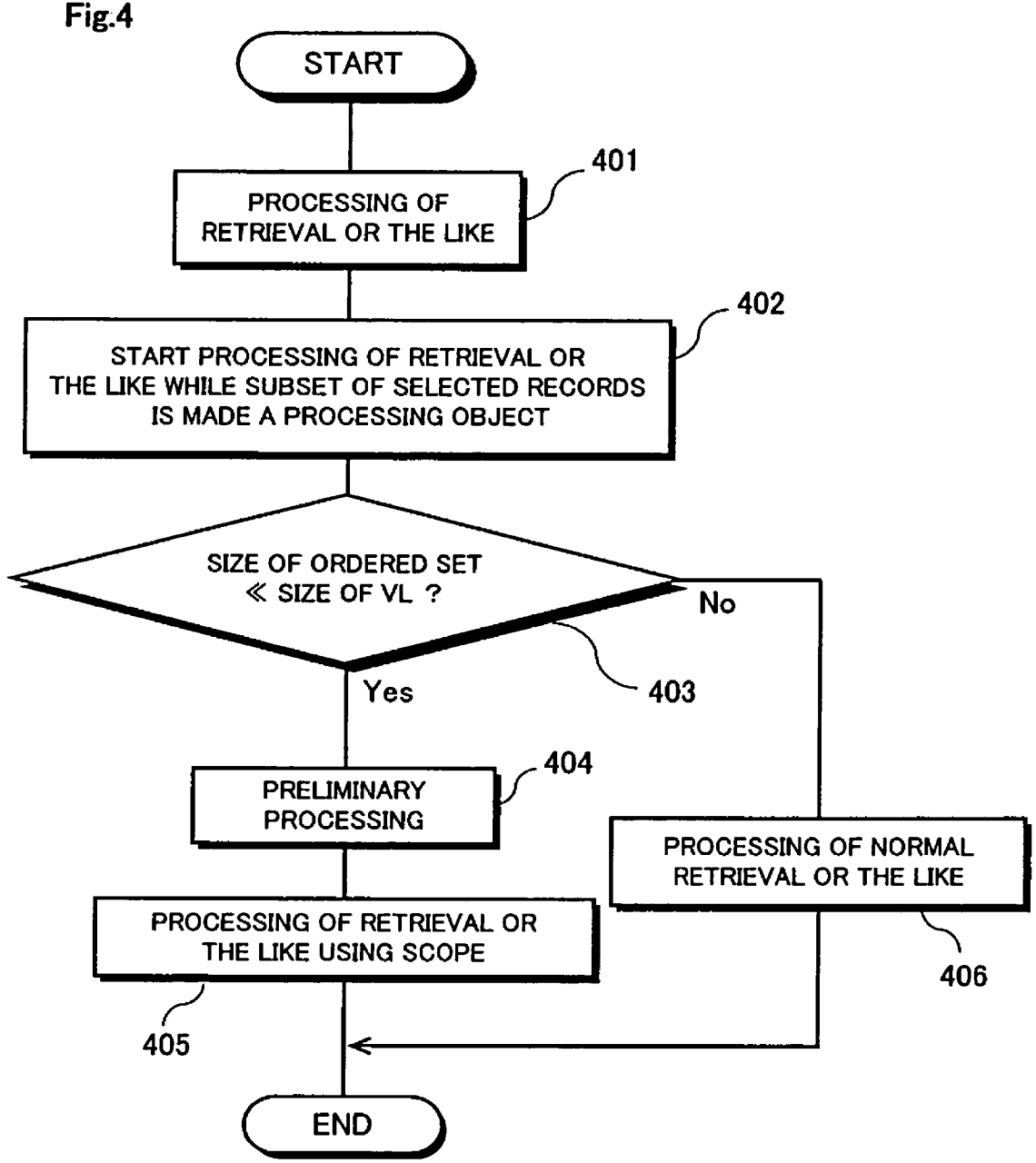
FIG. 4 is a flowchart showing the outline of a processing executed by the computer system in an embodiment.

Next, the outline of the processing executed by the computer system 10 will be described. As shown in FIG. 4, in the embodiment, according to the processing of retrieval, aggregation or sort in which all the records or part thereof is a processing object, the records are more limitedly selected (step 401). Further, a set having the selected records is made the processing object, and when the processing of retrieval, aggregation, sort or join is started (step 402), a preliminary processing is performed (step 404) under a definite condition (step 403). This preliminary processing is referred to as a setting processing of "scope" in some cases, and a processing of retrieval or the like to be performed after the preliminary processing is performed is referred to as a processing of retrieval or the like "using the scope" (step 405).

Incidentally, the set having the selected records is referred to as an "ordered set". In the array of the ordered set, the selected record numbers are arranged in a specified order (for example, an ascending order). In the preliminary processing, a second pointer array (PV2) and a second value list (VL2), which are used for a later processing of retrieval or the like, are created. This creation processing will be described later. The second pointer array contains elements equal to the number of elements of the ordered set, and indicates elements in the second value list corresponding to the elements in the array of the ordered set. The second value list contains storage position numbers of the value list (VL). The number of elements of the second value list is not larger than the number of elements in the array of the ordered set. That is, only in the case where all item values corresponding to the elements (selected records) in the array of the ordered set are different from each other, the numbers of these elements coincide with each other. Accordingly, the number of elements in the array of the ordered set becomes a maximum value which the number of elements of the second value list can take.

Then, in this embodiment, in the case where the number of elements (size) of the original value list (VL) is sufficiently larger than the number of elements (size) in the array of the ordered set (see step 403), the processing using the second pointer array and the second VL in this embodiment, that is, the processing of retrieval or the like using the scope is performed (step 405). For example, it is appropriate that the size of the ordered set is made not larger than 1/n (n: a set value not smaller than 1) of the size of the VL. This value "n" can be set according to the number of records, the processing capacity of the processor, and the like.

The judgment as stated above is executed from the following reason. In the processing using the scope, the preliminary processing (step 404) is needed, and its execution takes time. Thus, only in the case where the size of the ordered set (actually, the size of the second value list) is sufficiently smaller than the size of the VL, and it is thinkable that even when the execution time of the preliminary processing is added, as compared with the execution of a normal processing (step 406), the whole processing time can be shortened, that is, only in the case where the processing time can be shortened, as compared with the normal processing, by the processing of retrieval or the like using the preliminary processing and the scope, it is desirable to perform the processing of the step 404 and the step 405.

Accordingly, the statement "sufficiently small" means such smallness that the processing time can be shortened even though the preliminary processing is performed, and the largeness of an absolute number is not defined.

Figure 5:
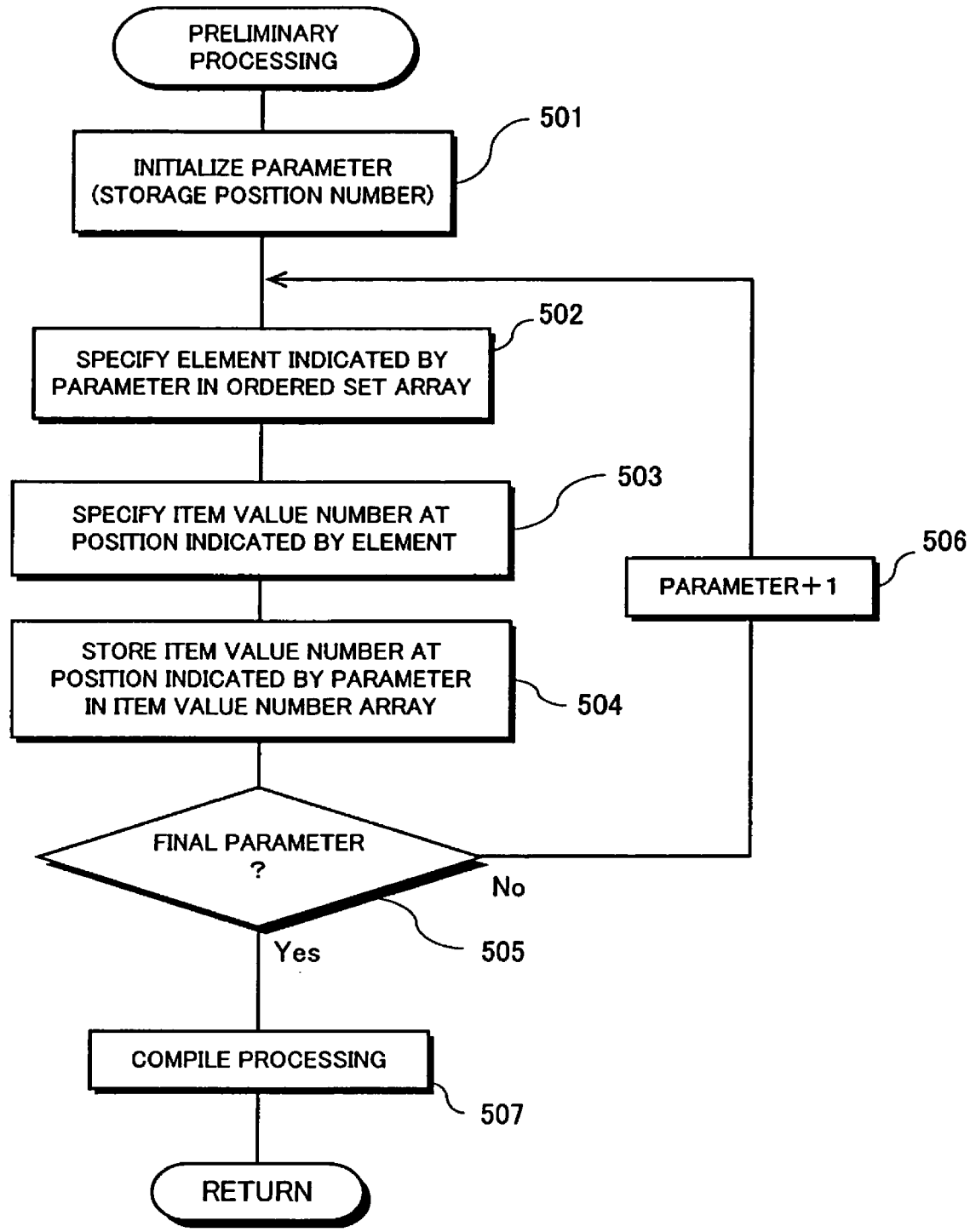
FIG. 5 is a flowchart showing a preliminary processing of an embodiment.

Next, the preliminary processing of the embodiment will be described. FIG. 5 is a flowchart showing the preliminary processing of this embodiment. As shown in FIG. 5, after a parameter to specify a position (storage position number) in an array of an ordered set is initialized (step 501), an element in the array of the ordered set indicated by the parameter is specified (step 502). Initially, in FIG. 6, an element "0" at a storage position number "0" in an array 601 of an ordered set is specified.

Next, by referring to an element in the pointer array indicated by the element in the array of the ordered set, a number (item value number) of an item value at a position indicated by the element is specified (step 503). In the example of the initial state, an element "2" in the pointer array indicated by the element "0" in the array of the ordered set is specified. Since this element means a number indicating a position of a relevant element (item value) in the value list, this is referred to as an item value number.

This item value number is arranged at a position indicated by the parameter in an item value number array separately provided (step 504). In the example of the initial state, the element (item value number) "2" in the pointer array 212 is stored at a position indicated by the parameter "0" in an item value number array 611. Incidentally, the item value number array contains elements the number of which is equal to that of the array of the ordered set.

Figure 6:
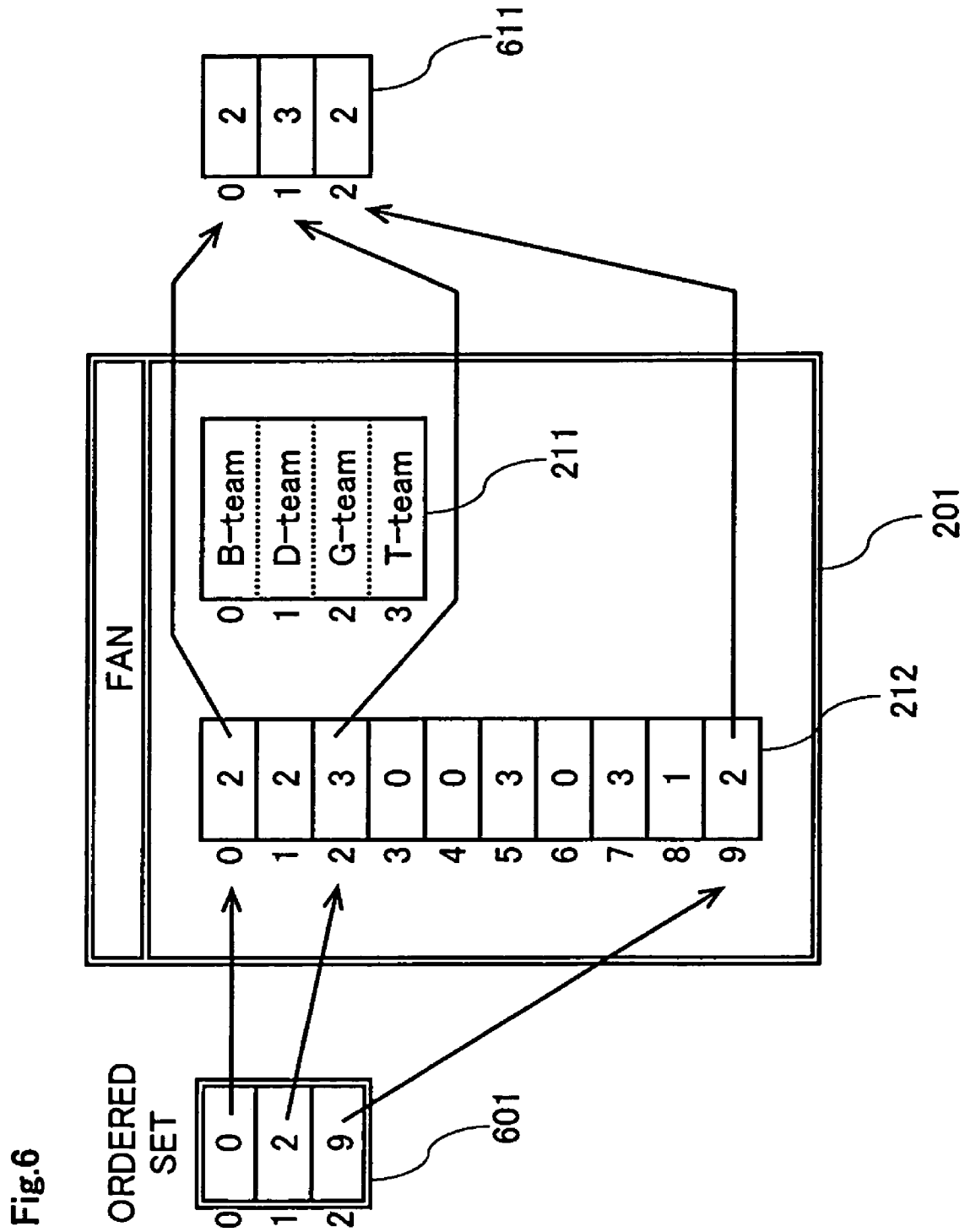
FIG. 6 is a view for explaining creation of an item value number array of an embodiment.

By repeating the processing as stated above (see steps 505 and 506), the item value number array containing the corresponding item value number for each element (selected record number) in the ordered set can be created (see reference numeral 611 in FIG. 6).

When the creation of the item value number array is completed, compile processing is executed (step 507). In this embodiment, in the case where a subset of records is a processing object, reference is made to only item values in a value list relevant to the subset. Accordingly, since the scope as the processing object is limited, it is also referred to as "scope" in the specification.

In order to realize the scope, there are required a subset of the value list to which an element in a portion set refers, and a conversion array of an element (record number) in the subset of records and the subset of the value list. The former is a second value list (VL2), and the latter is a second pointer array (PV2). A processing of creating the second value list and the second pointer array is referred to as the compile processing.

Figure 7:
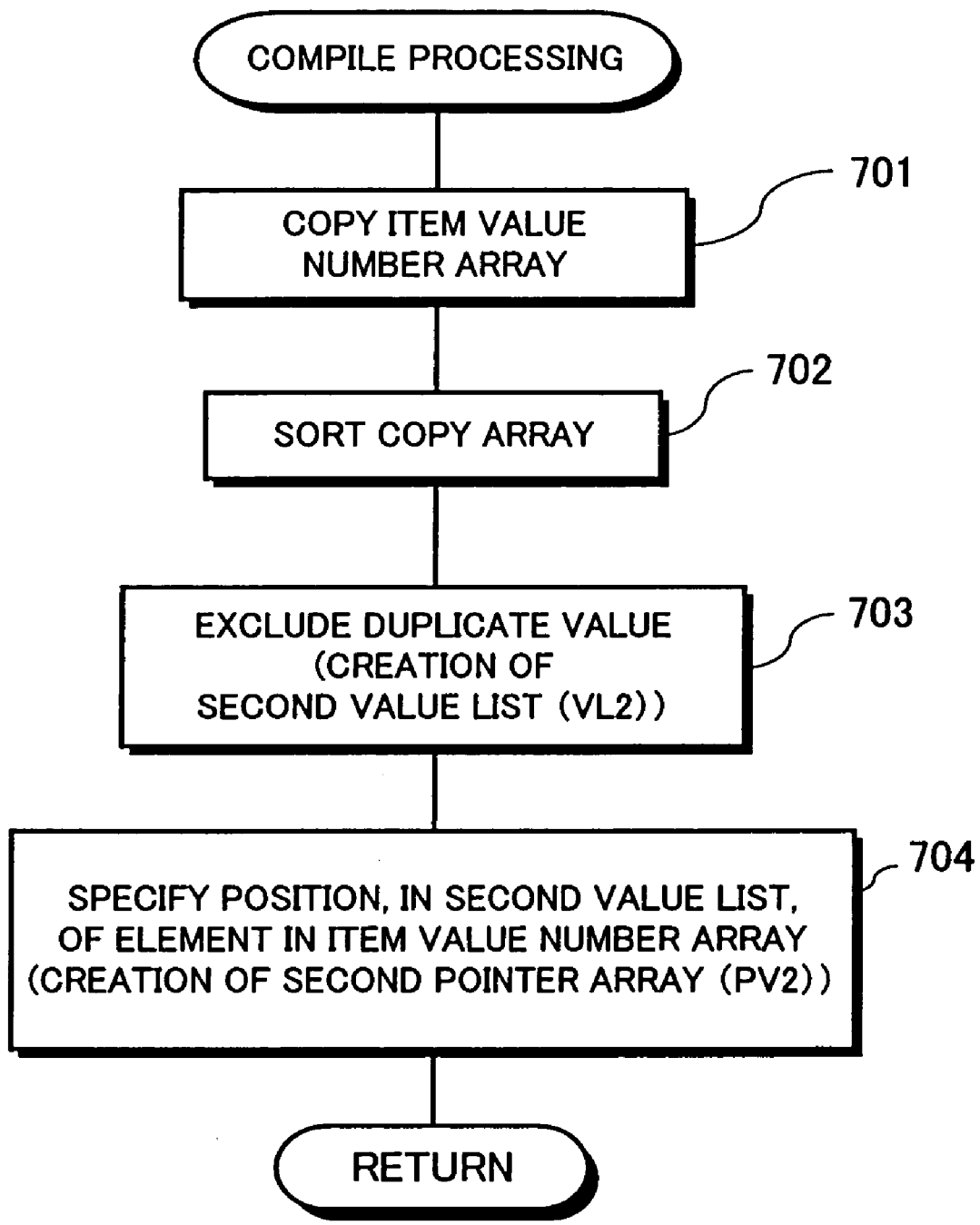
FIG. 7 is a flowchart showing an example of a compile processing of an embodiment.

FIG. 7 is a flowchart showing an example of the compile processing. In the compile processing of this example, first, a copy of an item value number array is created (step 701). In the example relating to the information block 201 as shown in FIG. 6 and the array 601 of the ordered set as the subset of the records, as shown in FIG. 8(*a*), a copy array including the same elements as the item value number array (original array) is created.

Next, after the copy array is sorted (see step 702 and FIG. 8(*b*)), a duplicate value in the sorted copy array is excluded, and the array is condensed (see step 703 and FIG. 8(*c*)). In this way, the array in which the elements are sorted and the duplicate value is excluded becomes the second value list (VL2).

Further, a position, in the second value list, of each element in the item value number array (original array) is specified, and a value indicating the specified position is stored as an element of a storage position number of the original array into a newly prepared array (see step 704 and FIG. 8(*d*)). The array in which the element is stored at step 704 becomes the second pointer array (PV2).

It is thinkable that in an item value number array, a component of a value and a component of a position are mixed. Then, at the processing of steps 701 to 703, only the component of the value is extracted, and the second value list (VL2) including only the component of the extracted value is created. Besides, at subsequent step 704, the component of the position is extracted, and the second pointer array (PV2) including only the component of the position is created.

The second value list and the second pointer array created by the compile processing in this way are used, as part of the information block, for the processing of retrieval, aggregation, sort, join and the like described later.

Figure 9:
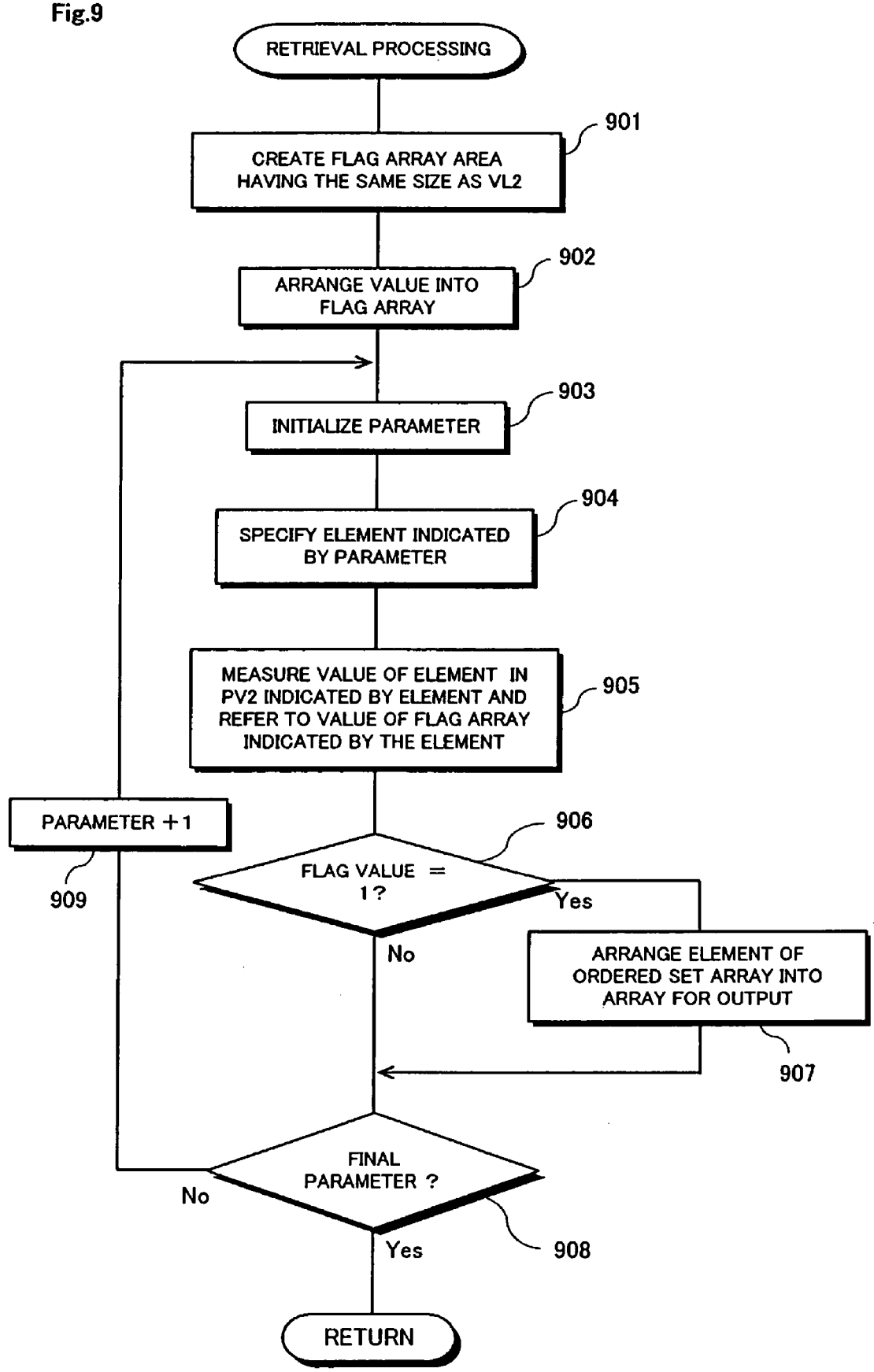
FIG. 9 is a flowchart showing a retrieval processing of an embodiment.

Next, the retrieval processing using the second value list and the second pointer array (using the scope) will be described. FIG. 9 is a flowchart showing the retrieval processing using the scope according to this embodiment. In this processing, first, a flag array area having the same size as the second value list (VL2) is ensured (step 901). In this flag array, "1" is arranged at the same position as the position (storage position) where among elements (item values) of the value list, one which becomes the retrieval object is stored, and "0" is arranged at the other position. Accordingly, at a next step, the value of "1" or "0" is arranged in the flag array.

Figure 10:
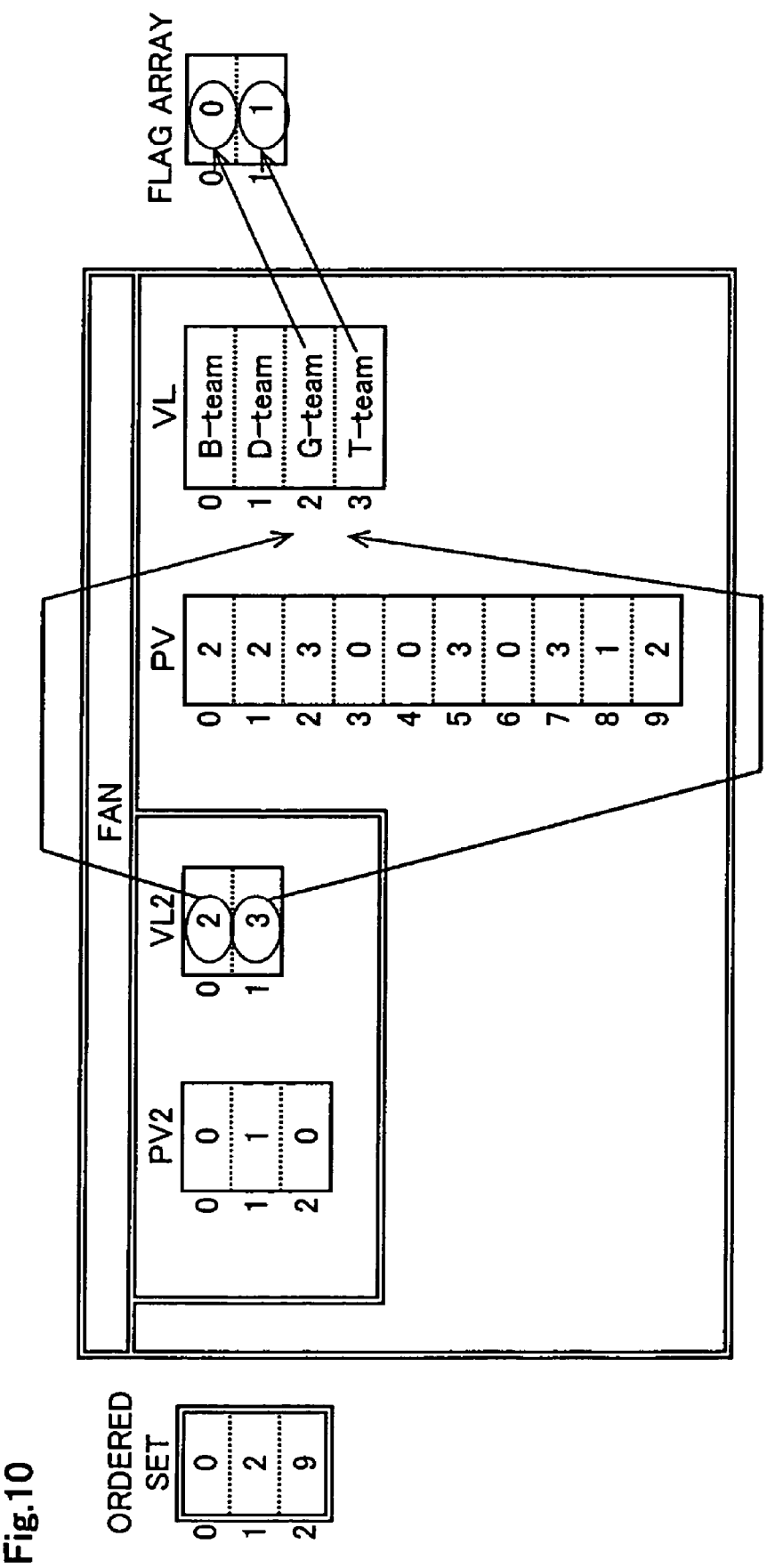
FIG. 10 is a view for explaining the retrieval processing of the embodiment.

FIG. 10 shows an example in which with respect to an item "fan" of a selected record (ordered set), a record having an item value of "T-team" is retrieved. Here, an element of a second value list (VL2) is specified, and it is judged whether or not an element (item value) in the value list (VL) indicated by the element is a retrieval object. When the item value is the retrieval object, in the flag array, "1" is arranged at the position corresponding to the storage position of the element of the second value list (VL2). In the example of FIG. 10, since the item value "T-team" is the retrieval object, the value "1" is arranged in the flag array at the storage position (storage position number "1") of the element indicating the item value "T-team" of the value list (VL) in the second value list (VL2).

Figure 11:
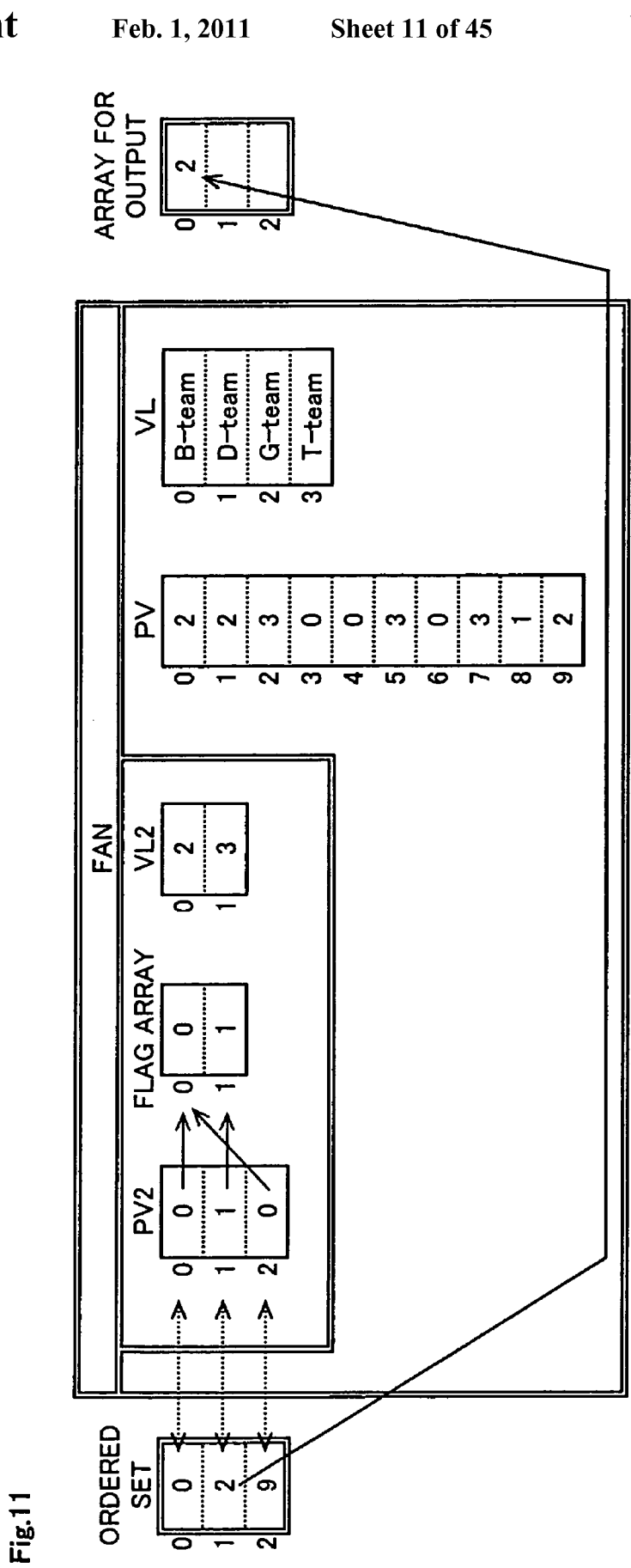
FIG. 11 is a view for explaining the retrieval processing of the embodiment.

In this way, when the value is arranged in the flag array, after the parameter indicating the position (storage position number) in the array of the ordered set is initialized (step 903), the element in the array of the ordered set indicated by the parameter is specified (step 904). In the example of FIG. 11, initially, in the array of the ordered set, the element "0" at the storage position number "0" is specified. Next, an element in the second pointer array (PV2) indicated by the element is specified, and further, a value in the flag array indicated by the element in the PV2 is specified (step 905). In the example of the initial state, it is specified that the value of the flag array at the position indicated by the element "0" in the second pointer array (PV2) is "0".

Next, it is judged whether or not the specified flag value is "1" (step 906). When the flag value is "1" (Yes at step 906), the element of the array of the ordered set is arranged in a provided array for output (step 907). In the example of FIG. 11, in the array of the ordered set, with respect to the element "2" of the storage position number "1", through the PV2 and the flag arrangement, the flag value in the flag array becomes "1". Accordingly, the element "2" of the array of the ordered set is stored in the array for output.

The processing as stated above is performed in relation to all parameters for the storage position numbers of the ordered set (see steps 908 and 909). The elements obtained in the array for output respectively become the record numbers extracted by the retrieval.

As stated above, according to this embodiment, the information (storage position number of the value list) indicating the element in the value list, which is made to correspond to the element in the ordered set as the subset of the records, is stored in the second value list (VL2). In the retrieval processing, the flag array having the same size as this size is created, reference is made to the value in the flag array, and judgment is made as to whether or not it is the record of the retrieval object. Since the size of the flag array is equal to the size of the second value list, it is sufficiently small as compared with the size of the value list relating to all records. Accordingly, the time required for the creation of the flag array and for the reference to values can be shortened, and by this, it becomes possible to sufficiently shorten the processing time of the retrieval processing.

Next, aggregation processing using the scope will be described. The aggregation processing is for calculating the number of records having one or more specific item values. In this embodiment, an existence number array having the same size as a second value list is provided, the number of records relevant to an item value in the second value list (VL2) is stored in the existence number array, and an element in the existence number array is extracted, so that aggregation can be instantly realized.

FIG. 12 is a view showing a second pointer array (PV2) in an information block relating to an item "fan", a second value list (VL2) and an existence number array. In the PV2, two elements at storage position numbers "0" and "2" coincide with the storage position number "0" of the VL2. Accordingly, in the existence number array, the element at the storage position number "0" becomes "2". On the other hand, in the PV2, one (single) element at the storage position number "1" coincides with the storage position number "1" of the VL2. Accordingly, in the existence number array, the element at the storage position number "1" becomes "1". Incidentally, creation of the existence number array will be described in detail in a sort processing described next.

According to this embodiment, also in the aggregation processing, the size of the existence number array to be used can be made the same size as the second value list which is sufficiently smaller than the original value list. Accordingly, the time required for the creation of the existence number array can be shortened, and by this, it becomes possible to shorten the whole processing time.

Figure 13:
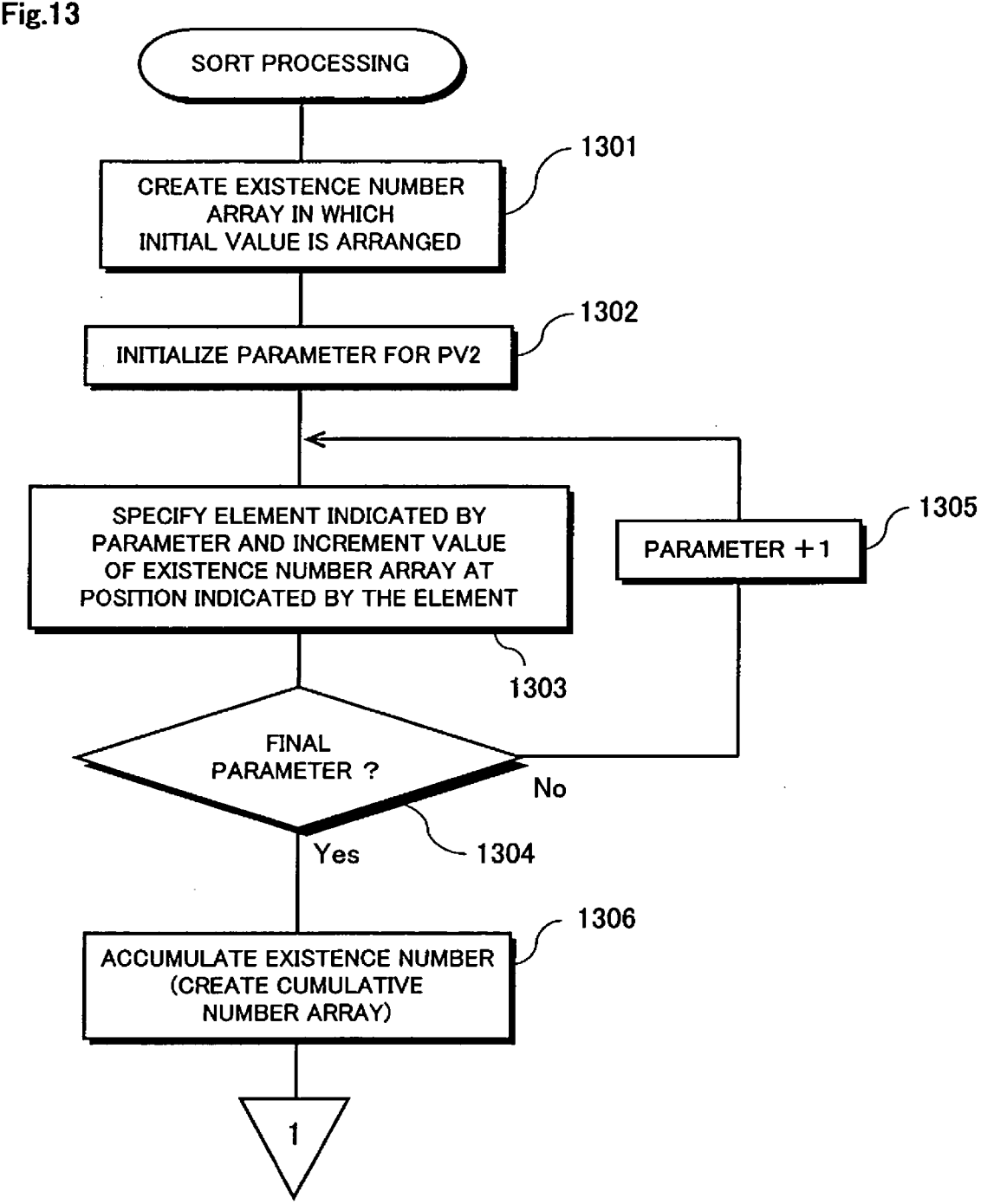
FIG. 13 is a flowchart showing a sort processing of an embodiment.
Figure 14:
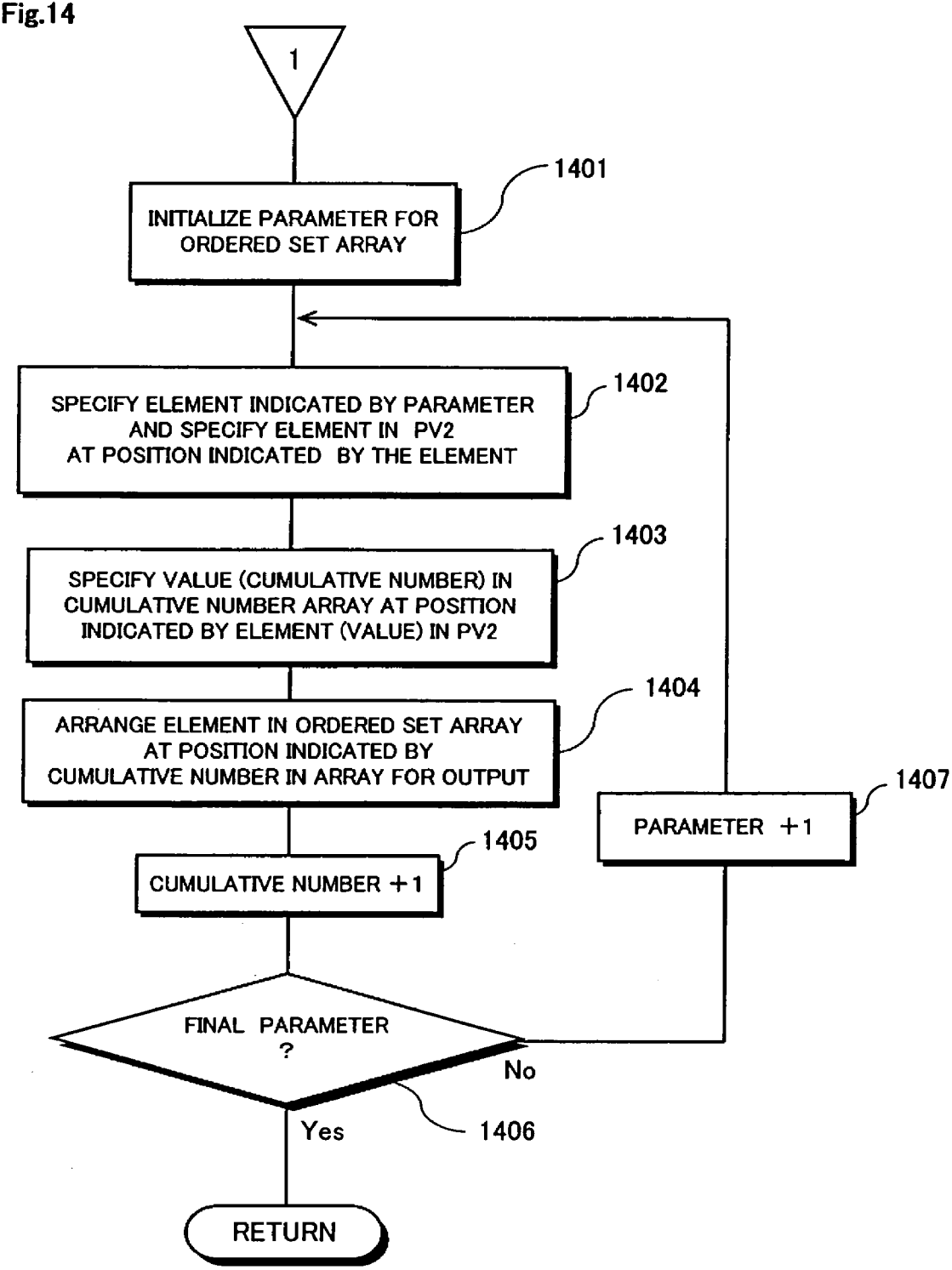
FIG. 14 is a flowchart showing the sort processing of the embodiment.

Next, the sort processing using the scope will be described. FIGS. 13 and 14 are flowcharts showing the sort processing using the scope. As shown in FIG. 13, first, an initial existence number array which has the same size as a second value list (VL2) and in which an initial value "0" is arranged is created (step 1301). Next, after a parameter to specify a position (storage position number) of a second pointer array (PV2) is initialized (step 1302), in an array of an ordered set, an element at a position indicated by the parameter is specified, and next, in the existence number array, the value of the position indicated by the element is incremented (step 1303). The step 1303 is repeated up to a final parameter (see steps 1304 and 1305). At a stage where the judgment is Yes at step 1305, the existence number array is completed.

Figure 15:
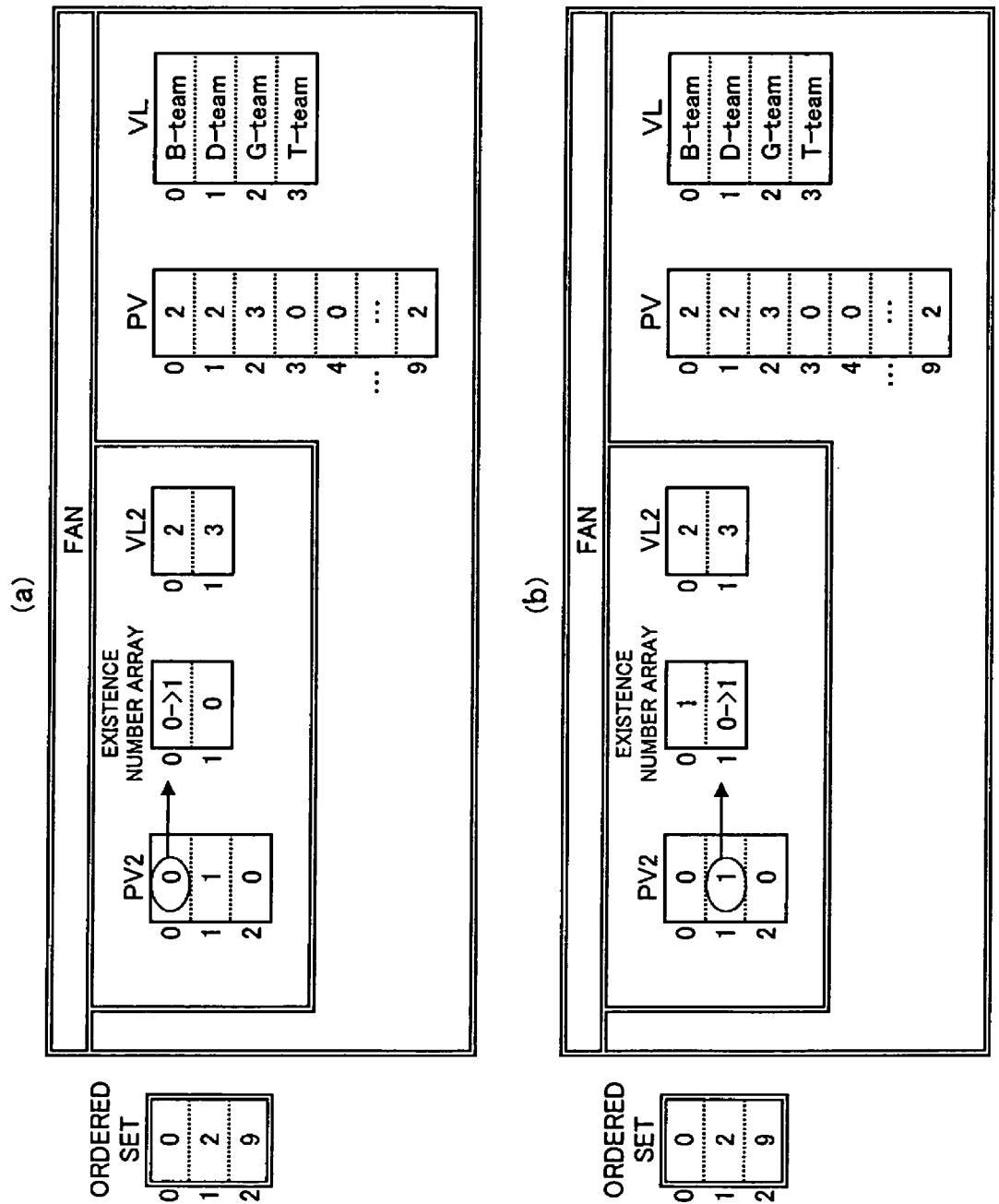
FIG. 15 is a view showing the sort processing of the embodiment.
Figure 16:
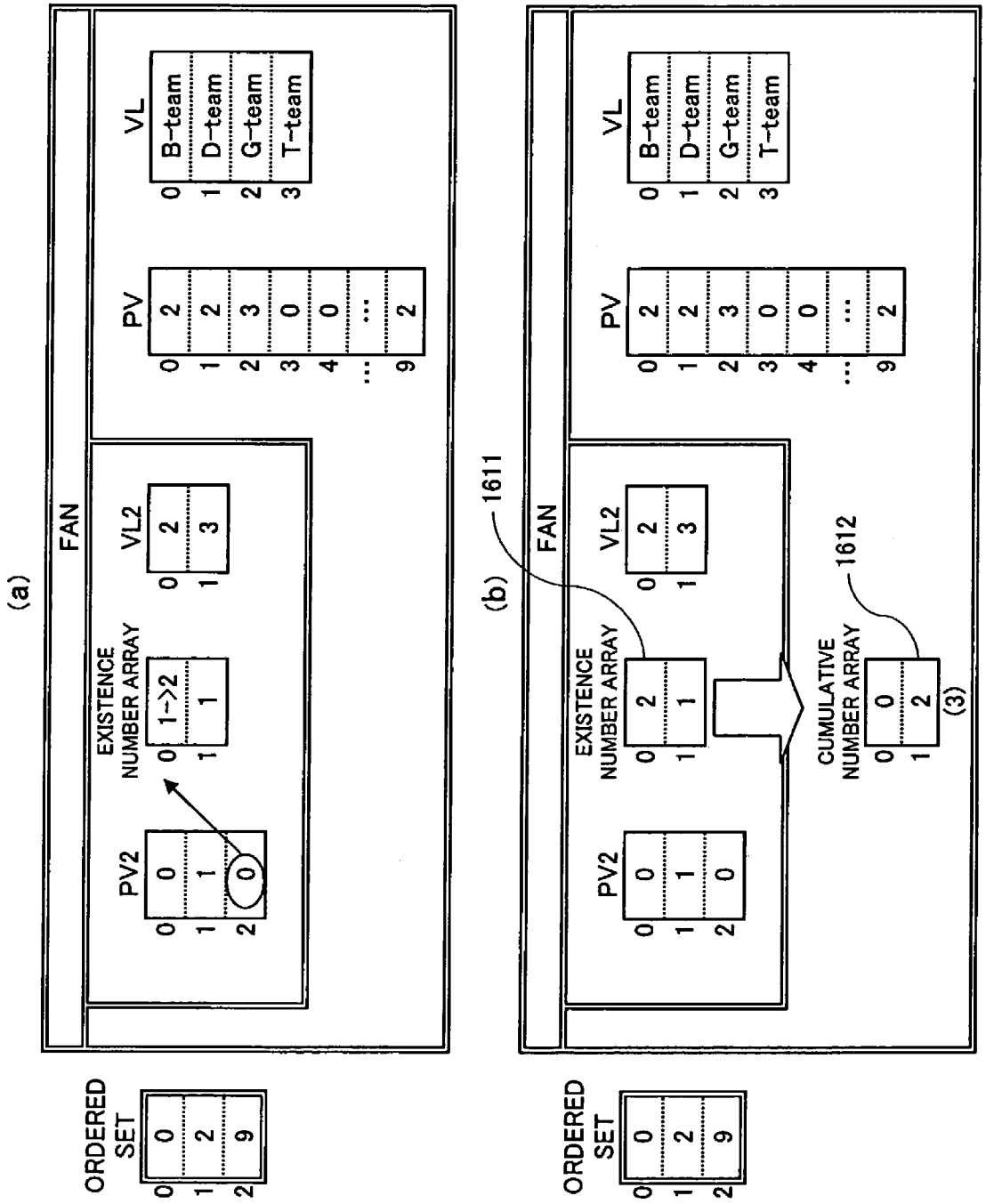
FIG. 16 is a view showing the sort processing of the embodiment.

FIGS. 15 and 16 are views showing examples of a creation process of the existence number array relating to the item "fan" and a cumulative number array described later. As shown in FIG. 15(a), initially, an element "0" of the PV2 at a position of a parameter "0" is specified, and in the existence number array, the value at the position indicated by the element of the PV2 is incremented from "0" to "1". Next, as shown in FIG. 15(b), an element "1" of the PV2 at a position of a parameter "1" is specified, and in the existence number array, the value at the position indicated by the element of the PV2 is incremented from "0" to "1". Further, as shown in FIG. 16(a), an element "0" of the PV2 at a position of a parameter "2" is specified, and in the existence number array, a value at a position indicated by the element of the PV2 is incremented from "1" to "2".

When the existence number array is completed, based on the existence number array, a cumulative number array storing a cumulative number in which the element is accumulated is created (step 1306). The cumulative number array indicates how many elements exist in total with respect to a storage position number before a certain storage position number. In the example of FIG. 16(b), in a cumulative number array 1612, an element at a storage position number "0" becomes "0" since there is no smaller storage position number. An element at a storage position number "1" is equal to the existence number (element in the existence number array 1611) of a storage position number "0" smaller than that and becomes "2". Besides, in this cumulative number array, as a further element (element at a storage position number "2"), the sum total "3" of the existence number of the storage position number smaller than the storage position number "2" may be arranged (see a bracket of reference numeral 1612).

When the cumulative number array is created in this way, a record number is arranged in a newly ensured array for output by using the cumulative number array. As shown in FIG. 14, first, after a parameter to specify a position (storage position number) in an array of an ordered set is initialized (step 1401), an element in the array of the ordered set indicated by the parameter is specified, and next, in the second pointer array (PV2), an element at a position indicated by the specified element is specified (step 1402).

Next, in the cumulative number array, a value (cumulative number) at a position indicated by the specified element in the second pointer array (PV2) is specified (step 1403). Further, an element in the array of the ordered set indicated by the parameter is arranged at a position indicated by the cumulative number specified at step 1403 in the separately provided array for output (step 1404). Thereafter, in the cumulative number array, the cumulative number specified at step 1403 is incremented (step 1405).

The cumulative number specified at step 1403 indicates the position where an element in the array of the ordered set as the origin to specify the cumulative number, that is, the record number is stored in the array for output. Accordingly, after a certain record number is arranged, the same cumulative number is next specified, and in order to store the record number in the array for output, at step 1405, the cumulative number is incremented. Besides, since the element in the array of the ordered set is stored, the array for output has the same size as the array of the ordered set.

The processing as stated above is repeated up to a final parameter (see steps 1406 and 1407). In the array for output obtained in this way, with respect to the item as the key, the sorted record number is indicated.

Figure 17:
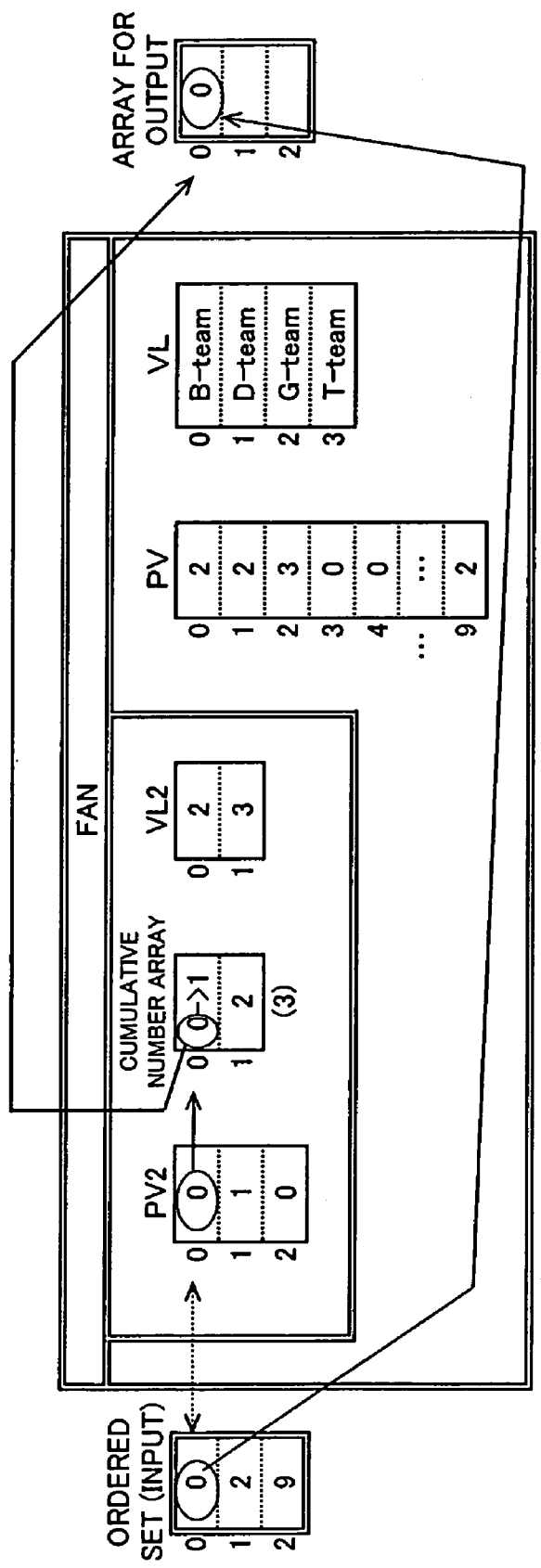
FIG. 17 is a view showing the sort processing of the embodiment.
Figure 18:
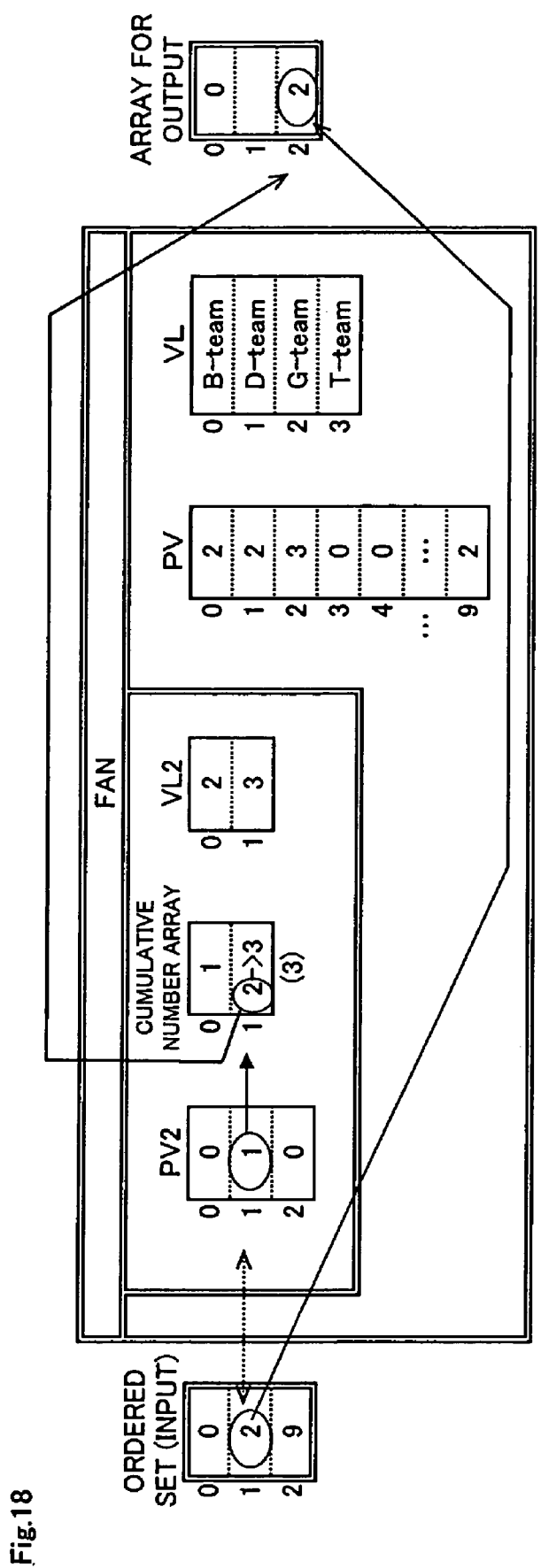
FIG. 18 is a view showing the sort processing of the embodiment.
Figure 19:
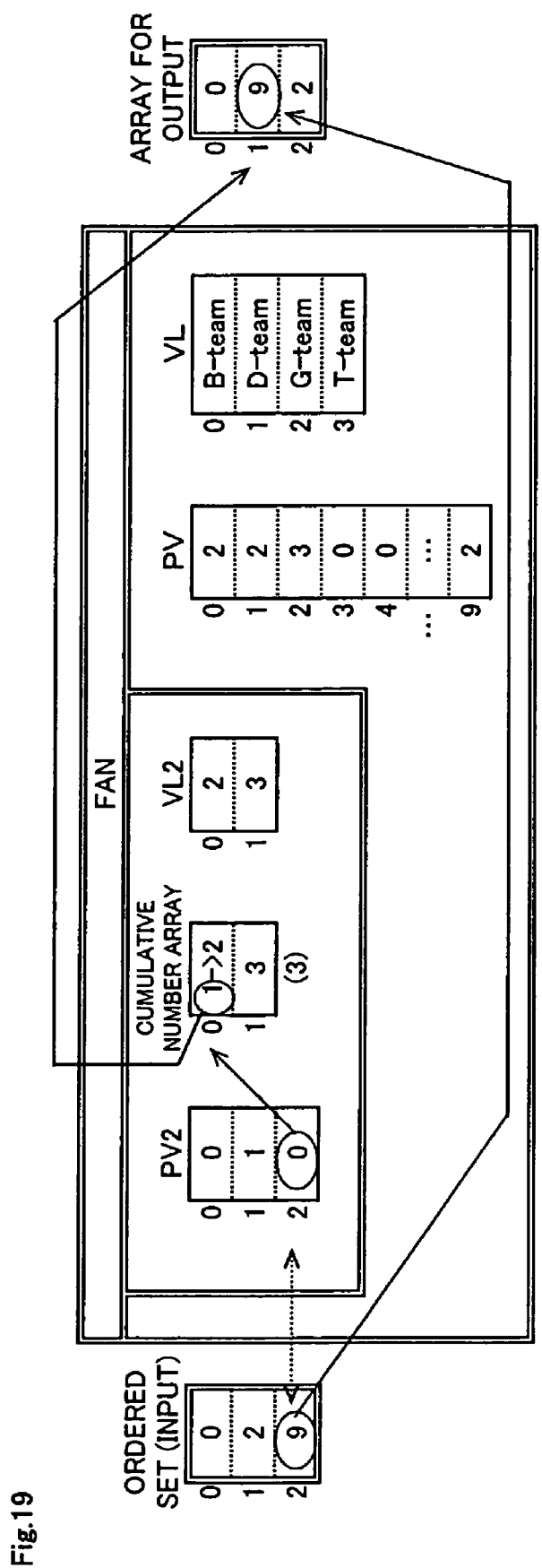
FIG. 19 is a view showing the sort processing of the embodiment.

FIGS. 17 to 19 are views showing states of arrays in a process of sort processing while the item "fan" is made a key. In FIG. 17, initially, an element (record number) "0" of an array of an ordered set indicated by a parameter "0" is specified. Accordingly, a value (cumulative number) of a cumulative number array at a position indicated by a relevant element in a PV2 is specified through the PV2. Accordingly, the element "0" of the array of the ordered set is stored in an array for output at the position of the storage position number "0"

indicated by the cumulative number, and then, the cumulative number is incremented from "0" to "1".

Also in FIG. 18, similarly, a value "2" of the array of the ordered set indicated by a parameter "1" is stored in the array for output at a position corresponding to a cumulative number "2" in the cumulative number array obtained through the PV2, and then, the cumulative number in the cumulative number array is incremented from "2" to "3". Further, also in FIG. 19, similarly, a value "9" of the array of the ordered set indicated by a parameter "2" is stored in the array for output at a position corresponding to a cumulative number "1" in the cumulative number array obtained through the PV2, and then, the cumulative number in the cumulative number array is incremented from "1" to "2".

As stated above, according to this embodiment, also in the processing of the sort, the cumulative number array used for the processing can be made the same size as the second value list, and by this, the processing time can be shortened.

Figure 20:
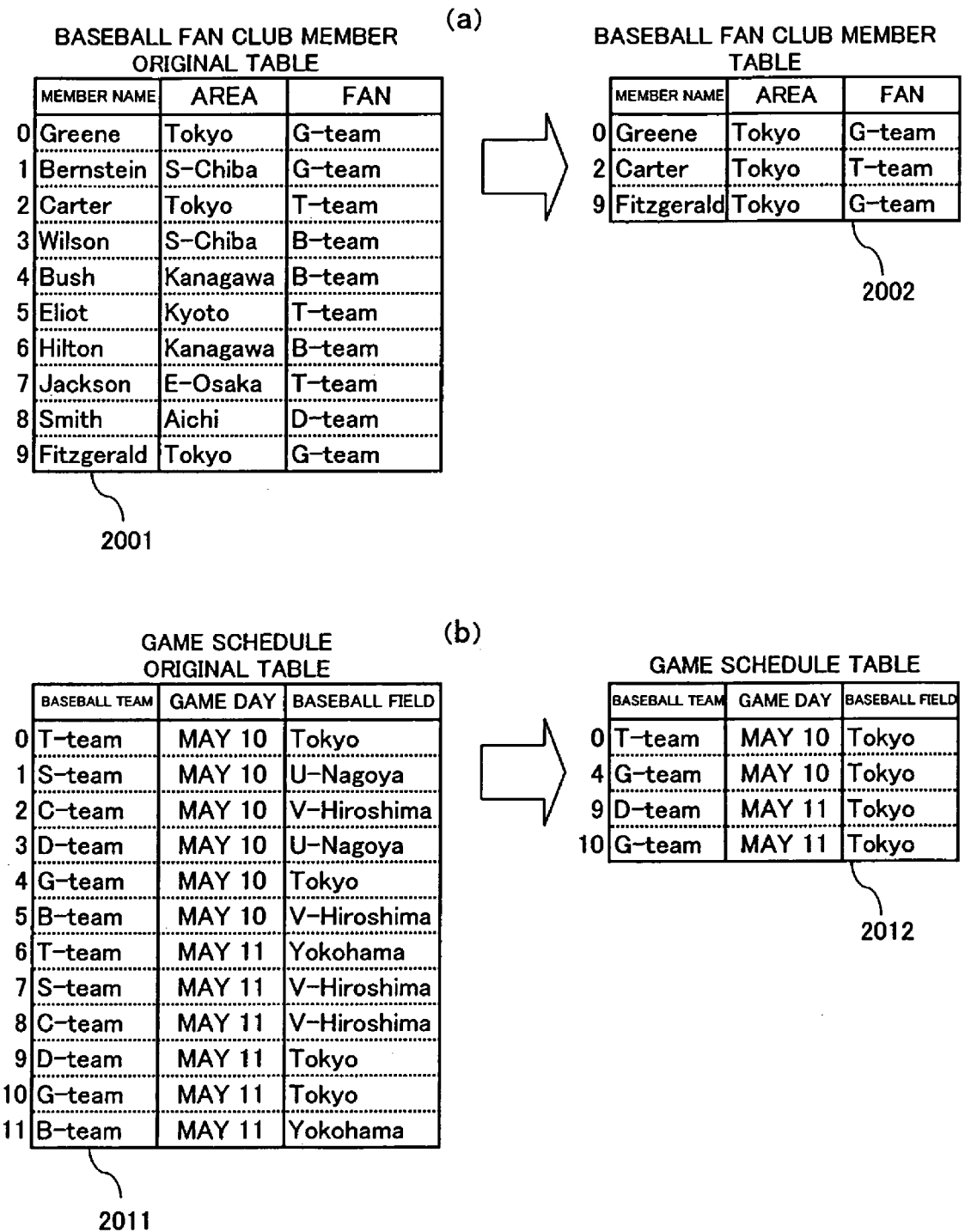
FIG. 20 is a view for explaining the outline of a join of an embodiment.

Next, a join processing using the scope will be described. The join processing means that from plural tables, a predetermined item is used as a key, and commonality between the plural tables is provided to join them. For example, consideration will be given to a case where from a source table (original table) 2001 of a baseball fan club member shown in FIG. 20(a), a record in which a value of an item "area" is "Tokyo" is extracted and a table (baseball fan club member table) 2002 is prepared, and as shown in FIG. 20(b), from an original table 2011 of a baseball game schedule, a record in which a value of an item "baseball field" is "Tokyo" is extracted and a table (game schedule table) 2012 is prepared. In the join processing, the item "area" in the baseball fan club member table 2011 and the item "baseball field" of the game schedule table 2012 are used as keys, and tables in which the key items are joined are created as shown in FIG. 21. Here, a table 2101 in which a sort order is reflected (kept) is referred to as a master side table, and the other table 2111 is referred to as a slave side table.

At the join processing, in both the master side and the slave side, a record having a predetermined value is extracted by using an item as a key, and a table is created. Accordingly, when the record is extracted, in the case where the number of elements (size) of the original value list is sufficiently larger than the number of elements (size) in an array of an ordered set, the join processing using the scope is performed.

According to this embodiment, for example, a game schedule original table has a structure as shown in FIG. 22. That is, with respect to each of items of "baseball team", "game day" and "baseball field", an information block including a pointer array (PV) for a value list and the value list (VL) is provided. Besides, as described above, records in which the value of "baseball field" is "Tokyo" have record numbers "0", "4", "9" and "10". Accordingly, an array in which the above record numbers are arranged in an ascending order becomes an array of an ordered set.

Figure 23:
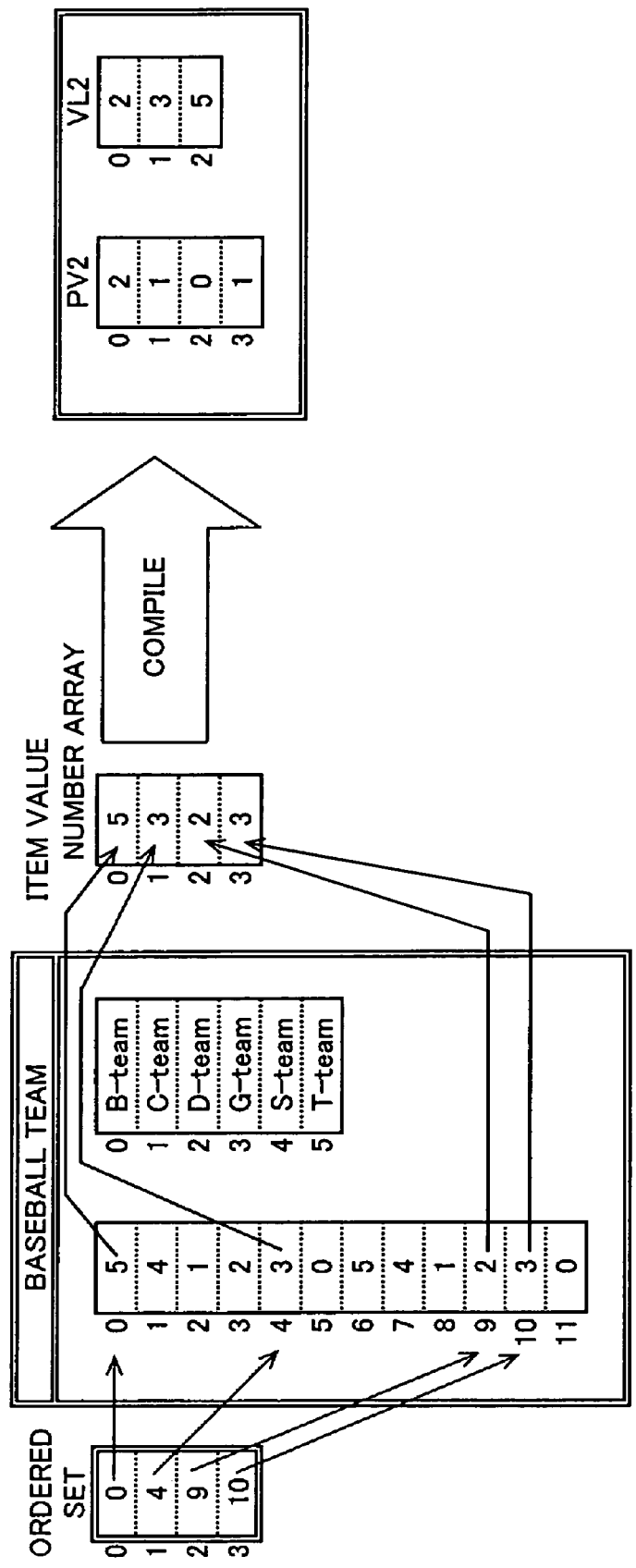
FIG. 23 is a view for explaining a join processing of the embodiment.

FIG. 23 is a view for explaining a process of a preliminary processing (see FIG. 5) relating to an information block of an item "baseball team". An item value number array is created by the processing of steps 501 to 505 in FIG. 5, and further, a second value list (VL2) and a second pointer array (PV2) are created by the compile processing (see step 507 of FIG. 5 and FIG. 7).

Figure 24:
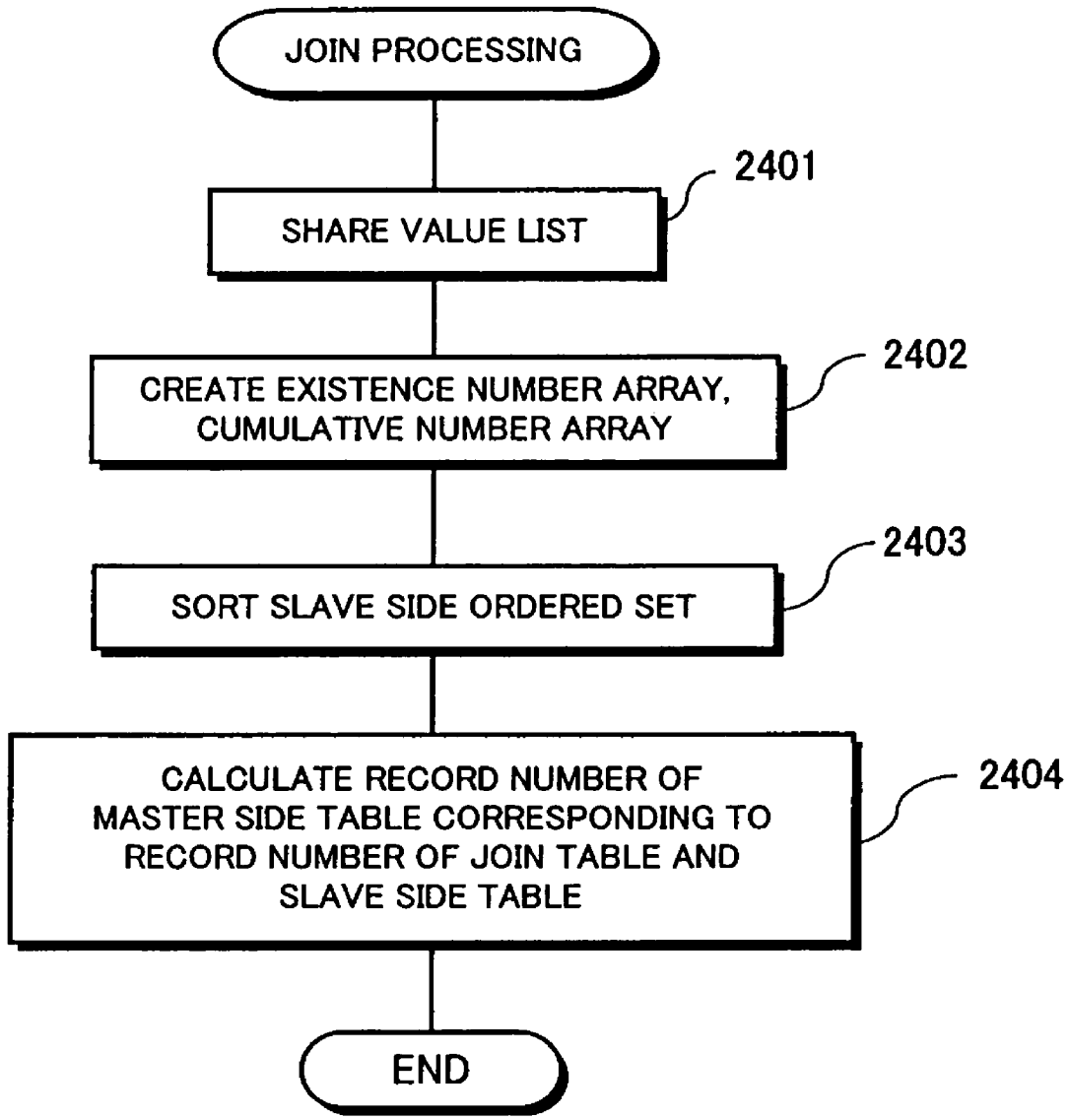
FIG. 24 is a flowchart for explaining the outline of the join processing of the embodiment.
Figure 25:
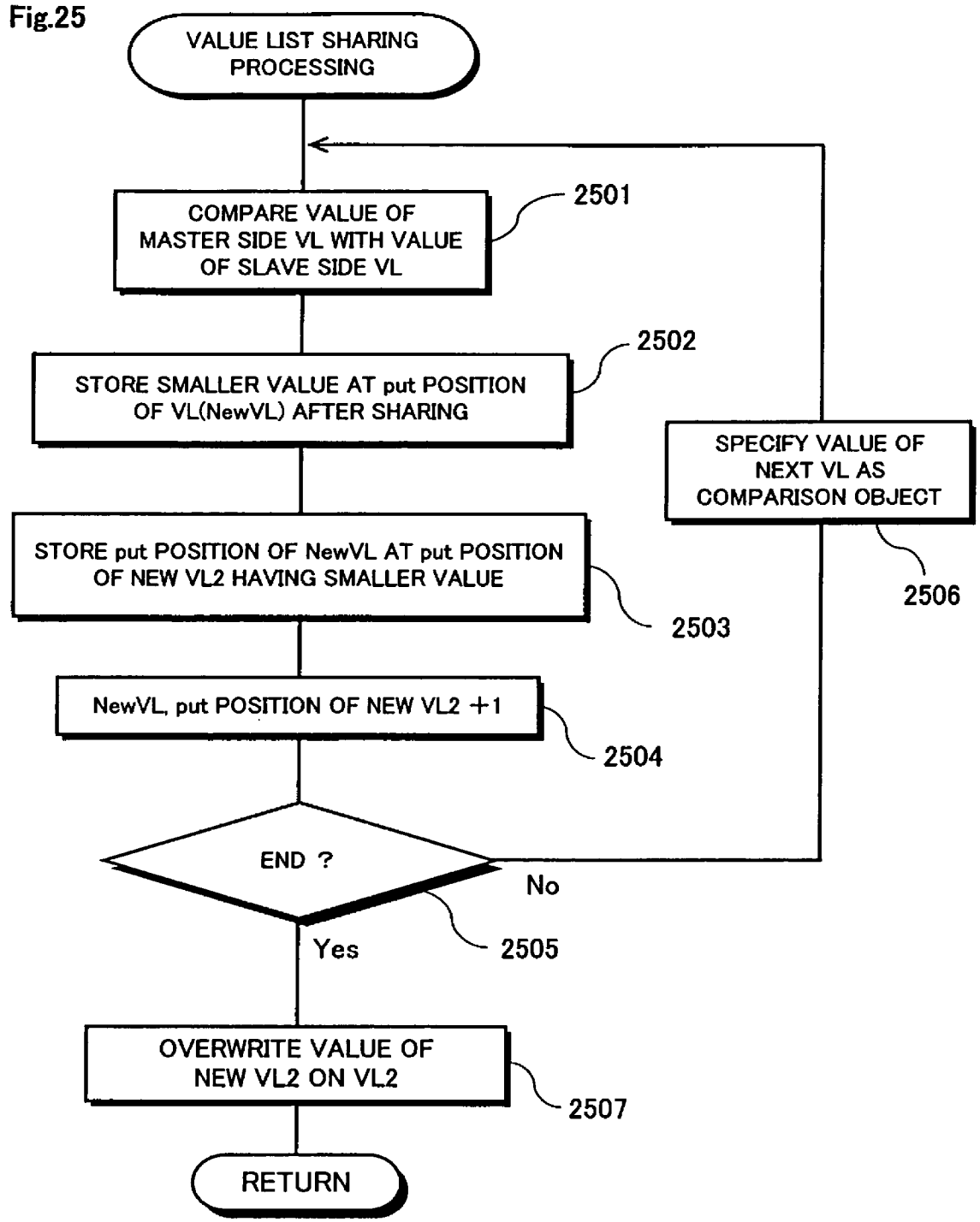
FIG. 25 is a flowchart showing a value list sharing processing of an embodiment.

FIG. 24 is a flowchart showing the join processing using the second value list and the second pointer array, that is, the join processing using the scope. In the join processing, first, a value list of an item as a key is shared (step 2401). FIG. 25 is a flowchart showing a value list sharing processing in more detail. In the value list sharing processing, first, a value in a master side value list is compared with a value in a slave side value list, and it is judged which value is small (for example, in the alphabet, which one is positioned ahead) (step 2501).

Figure 26:
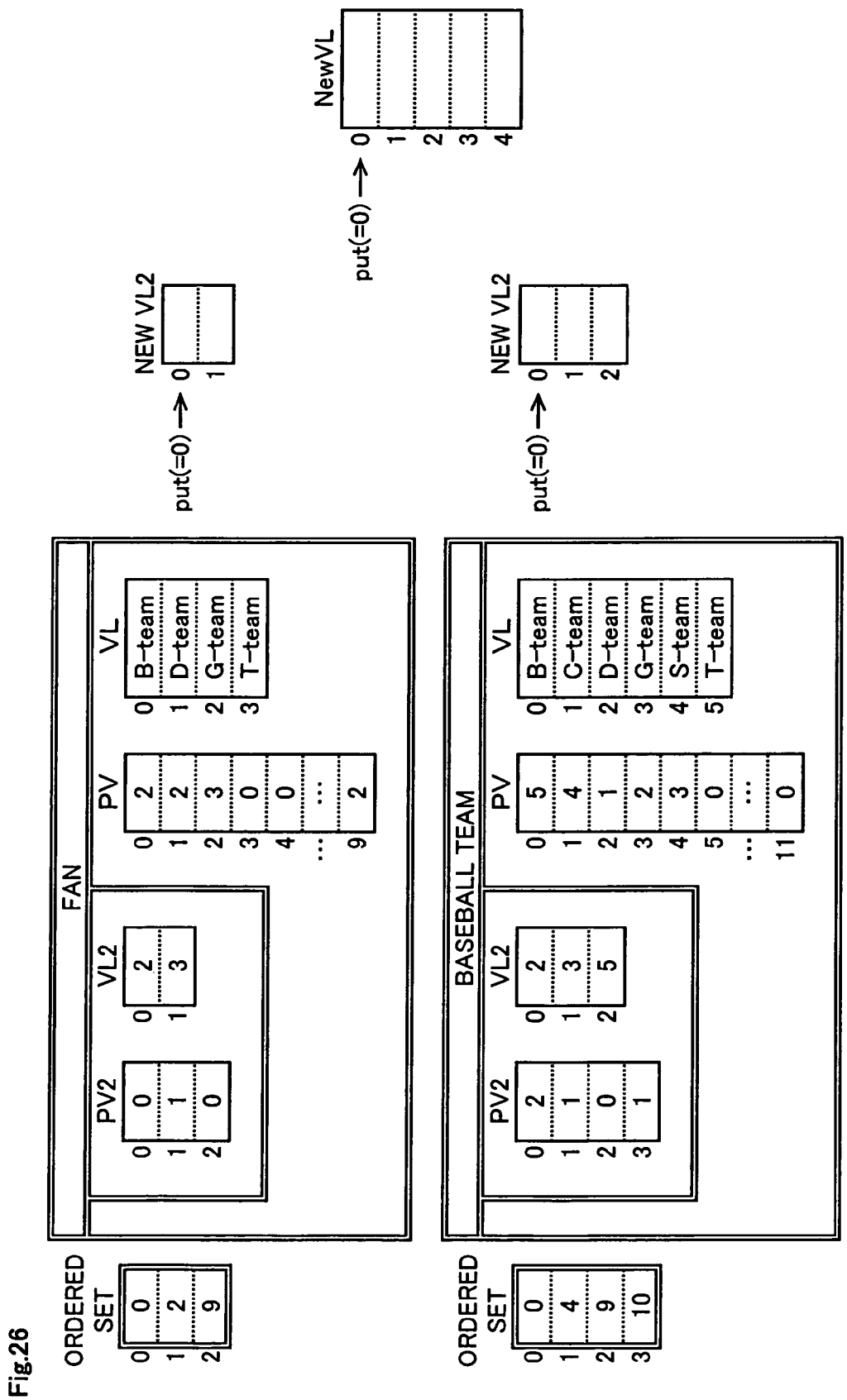
FIG. 26 is a view for explaining the join processing of the embodiment.

FIG. 26 is a view showing an initial state of an information block of an item "fan" constituting a master side table and an information block of an item "baseball team" constituting a slave side table after compile. As shown in FIG. 26, with respect to each of the information blocks, a new second value list (new VL2) for indicating values of a value list (NewVL) after sharing is provided, and in the second value list, a pointer (PUT pointer) indicating a position of an element as a processing object (that is, a position where a value is to be arranged) is arranged. The position indicated by this pointer is referred to as "PUT position". Similarly, a pointer (PUT pointer) indicating a position where a value is to be arranged in a value list after sharing is also prepared.

Figure 27:
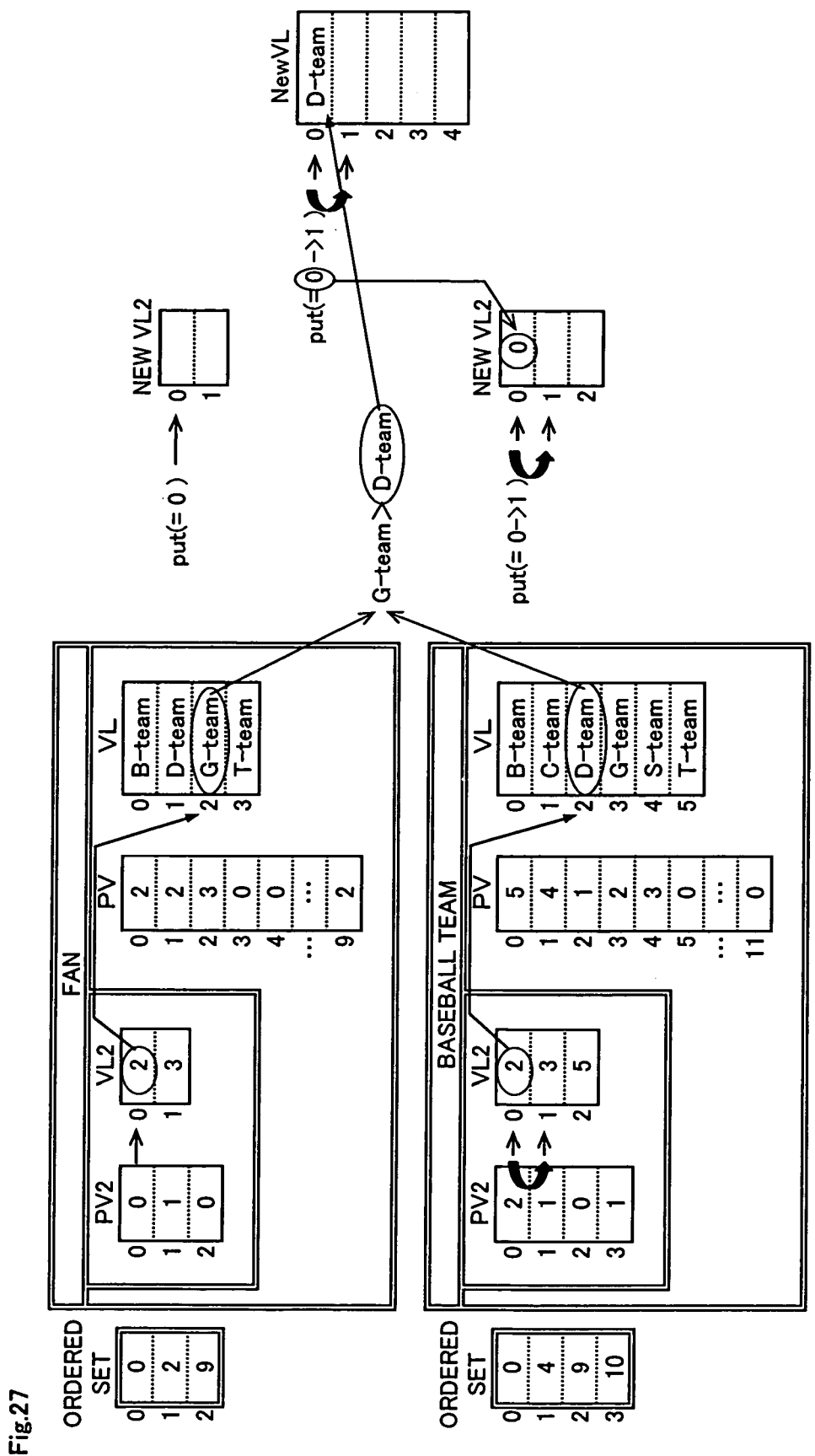
FIG. 27 is a view for explaining the join processing of the embodiment.

Initially, a value "G-team" of the master side value list (VL) indicated by a head element "2" of the master side second value list (VL2) is compared with a value "D-team" of the slave side value list (VL) indicated by a head element "2" of the slave side second value list (VL2), and it is judged that "D-team<G-team" is established in the alphabetical order (see FIG. 27).

Next, the value (in FIG. 27, "D-team") judged to be small from the result of the comparison is stored at a position (PUT position) indicated by the "PUT pointer" in the value list (newVL) after the sharing (step 2502). Next, in a new second value list (in FIG. 27, slave side "new VL2") which had values stored in the value list after the sharing at step 2502, a "PUT position" (in FIG. 27, "0") of the value list (newVL) after the sharing is stored at a position (PUT position) indicated by the "PUT pointer" (step 2503). By this, the new second value list (new VL2) in which the "PUT position" is stored indicates the corresponding element of the value list (newVL) after the sharing.

Next, the second value list (in FIG. 27, the slave side VL2) where the "PUT position" is stored and the "PUT position" of the value list (newVL) after the sharing are incremented (step 2504).

Figure 28:
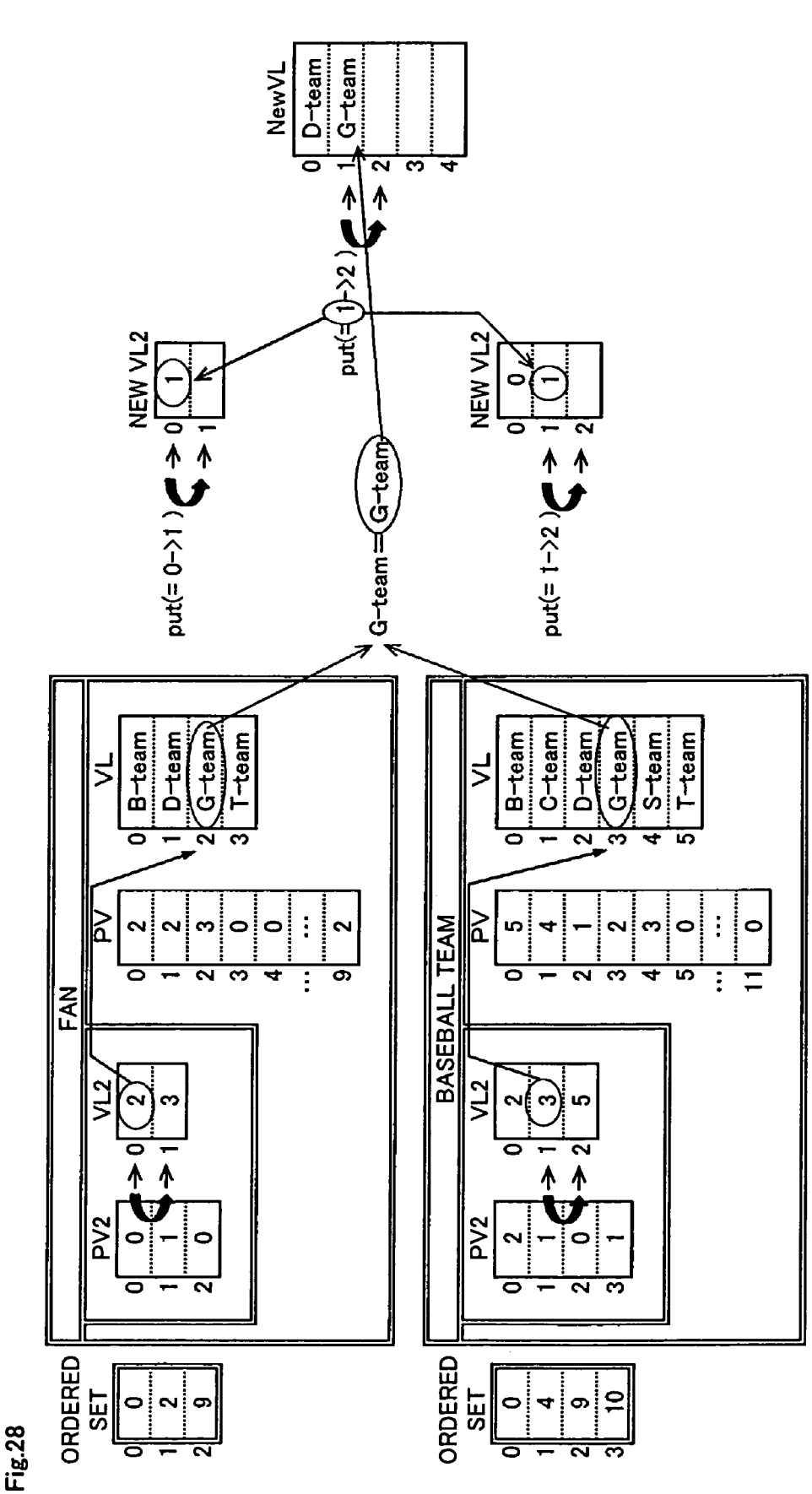
FIG. 28 is a view for explaining the join processing of the embodiment.

The processing as stated above is repeated up to the end of the master side second value list (VL2) and the end of the slave side second value list (VL2) (see step 2505 and step 2506). Subsequently to the example of FIG. 27, as shown in FIG. 28, an element "G-team" of the value list "VL" indicated by the head element "2" of the master side value list (VL2) is extracted, and on the other hand, an element "G-team" of the value list "VL" indicated by the second element "3" of the slave side second value list (VL2) is extracted. When both are compared with each other, because of "G-tem=G-team", "G-team" is stored in the "PUT position" of the value list (newVL) after the sharing, and the "PUT position" of the value list (newVL) after the sharing is stored at the "PUT position" of the new second value list (new VL2) of both the master side and the slave side. Thereafter, the "PUT position" of each of the value lists (new VL2, newVL) after the sharing is incremented.

Figure 29:
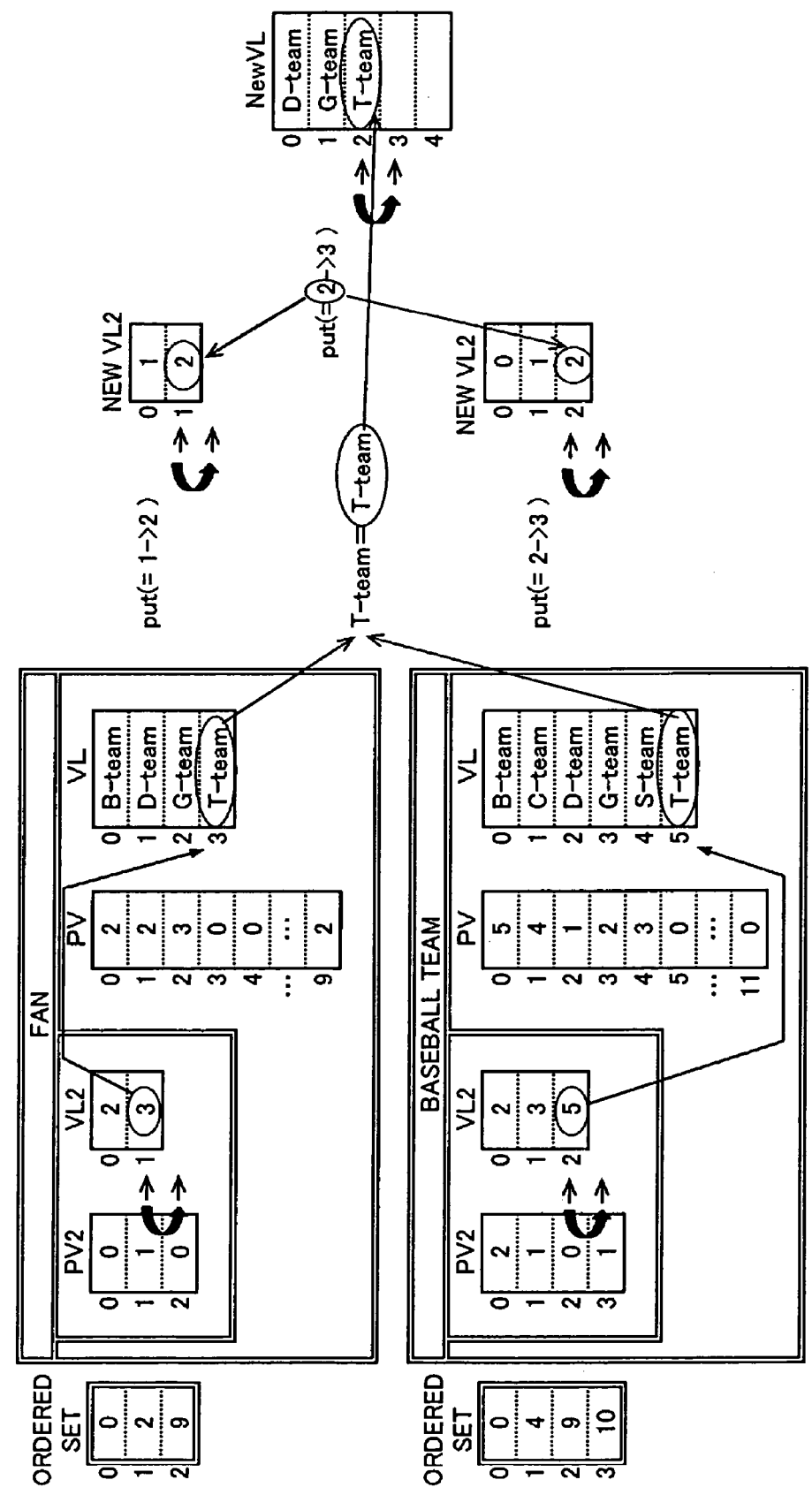
FIG. 29 is a view for explaining the join processing of the embodiment.
Figure 31:
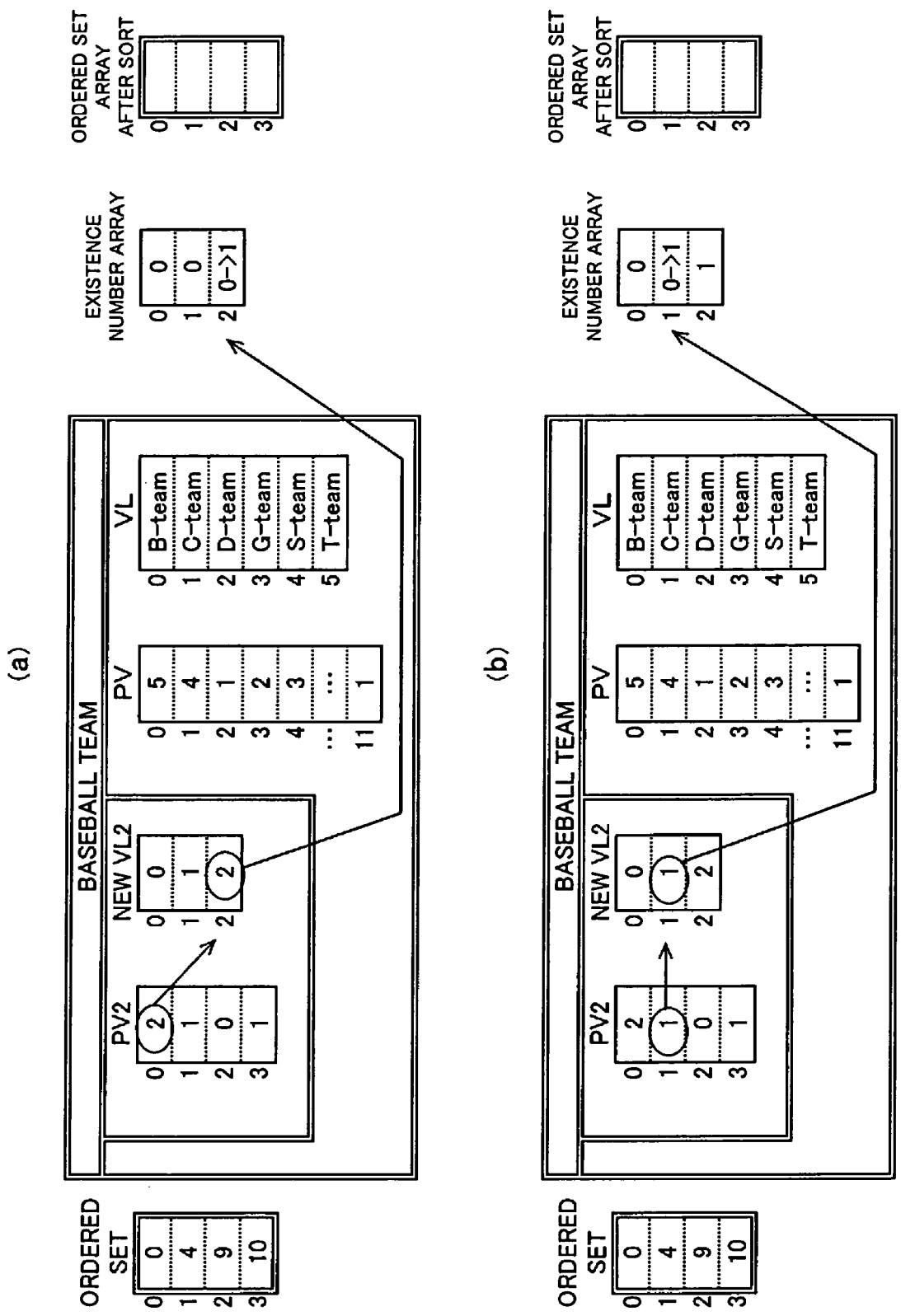
FIG. 31 is a view for explaining the join processing of the embodiment.
Figure 32:
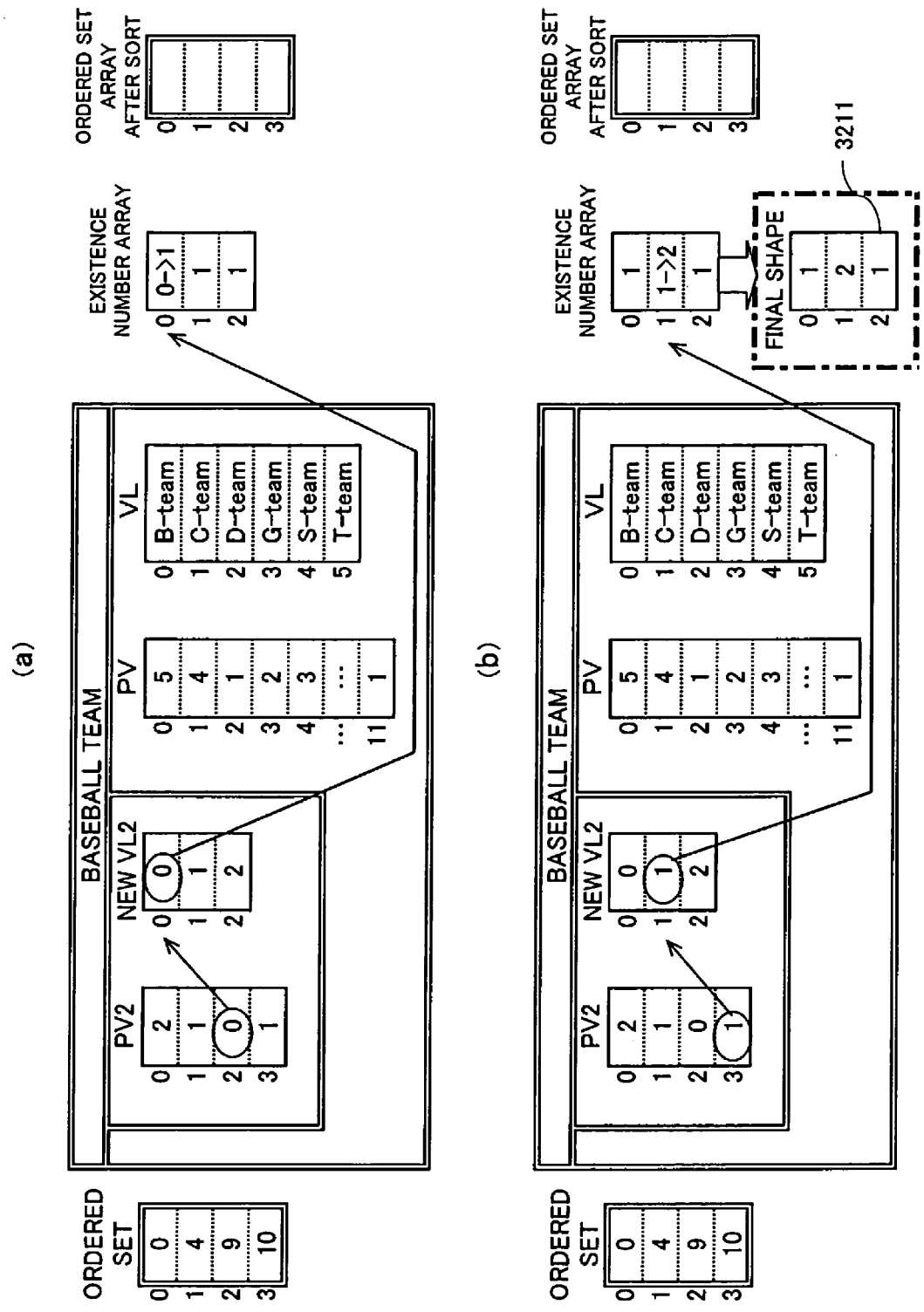
FIG. 32 is a view for explaining the join processing of the embodiment.

Subsequently to this, as shown in FIG. 29, an element "T-team" of the value list "VL" indicated by the second element "3" of the master side second value list (VL2) is extracted, and on the other hand, an element "T-team" of the value list "VL" indicated by the third element "5" of the slave side second value list (VL2) is extracted, and both are compared with each other. Here, because of "T-team=T-team", the "T-team" is stored at the "PUT position" of the value list (newVL) after the sharing, and the "PUT position" of the value list (newVL) after the sharing is stored at the "PIT position" of the new second value list (new VL2) of both the master side and the slave side. Thereafter, the "PUT position" of each of the arrays (newVL2, newVL) is incremented. In this way, the master side and the slave side new second value lists (new VL2) and the value list (NewVL) after the sharing are completed.

Incidentally, practically, the new second value list (new VL2) area is not separately created, but the second value list VL2 may be overwritten in the process of the processing. Besides, for convenience of explanation, the area of the value list (newVL) after the sharing is ensured and the value is arranged, however, this is not indispensable, and it is sufficient if only the size of the value list after the sharing is grasped and is stored in the memory or the like.

When the sharing of the value list is ended, a slave side existence number array, a master side cumulative number array, and a slave side cumulative number array are successively created (step 2403). This processing will be described in more detail with reference to FIGS. 31 to 34. First, a value in the second value list (new VL2) indicated by an element extracted from the slave side second pointer array (PV2) is specified. Next, a value at a position indicated by the value of the second value list (new VL2) in the existence number array is incremented.

In FIG. 31(a), a value "2" of the "new VL2" indicated by the head element "2" of the "PV2" is specified, and next, in the existence number array, a value at the storage position number "2" is incremented from "0" to "1". Similarly, with respect to the second element "1" of the "PV2", in the existence number array, a value at the storage position number "1" is incremented from "0" to "1" (see FIG. 31(b)). With respect to the third element "0" of the "PV2", in the existence number array, a value at a storage position number "0" is incremented from "0" to "1" (see FIG. 32(a)). With respect to the fourth element "1" of the "PV2", in the existence number array, a value at a storage position number "1" is incremented from "1" to "2" (see FIG. 32(b)). In this way, a final form of the slave side existence number array can be obtained (see reference numeral 3211).

Next, by using the slave side existence number array, the master side existence number array, and the cumulative number array in which the element (existence number) in the existence number array is accumulated are created. The element (existence number) of the master side existence number array indicates how many values in the value list, specified by the master side second pointer array, exist in the slave array.

Figure 33:
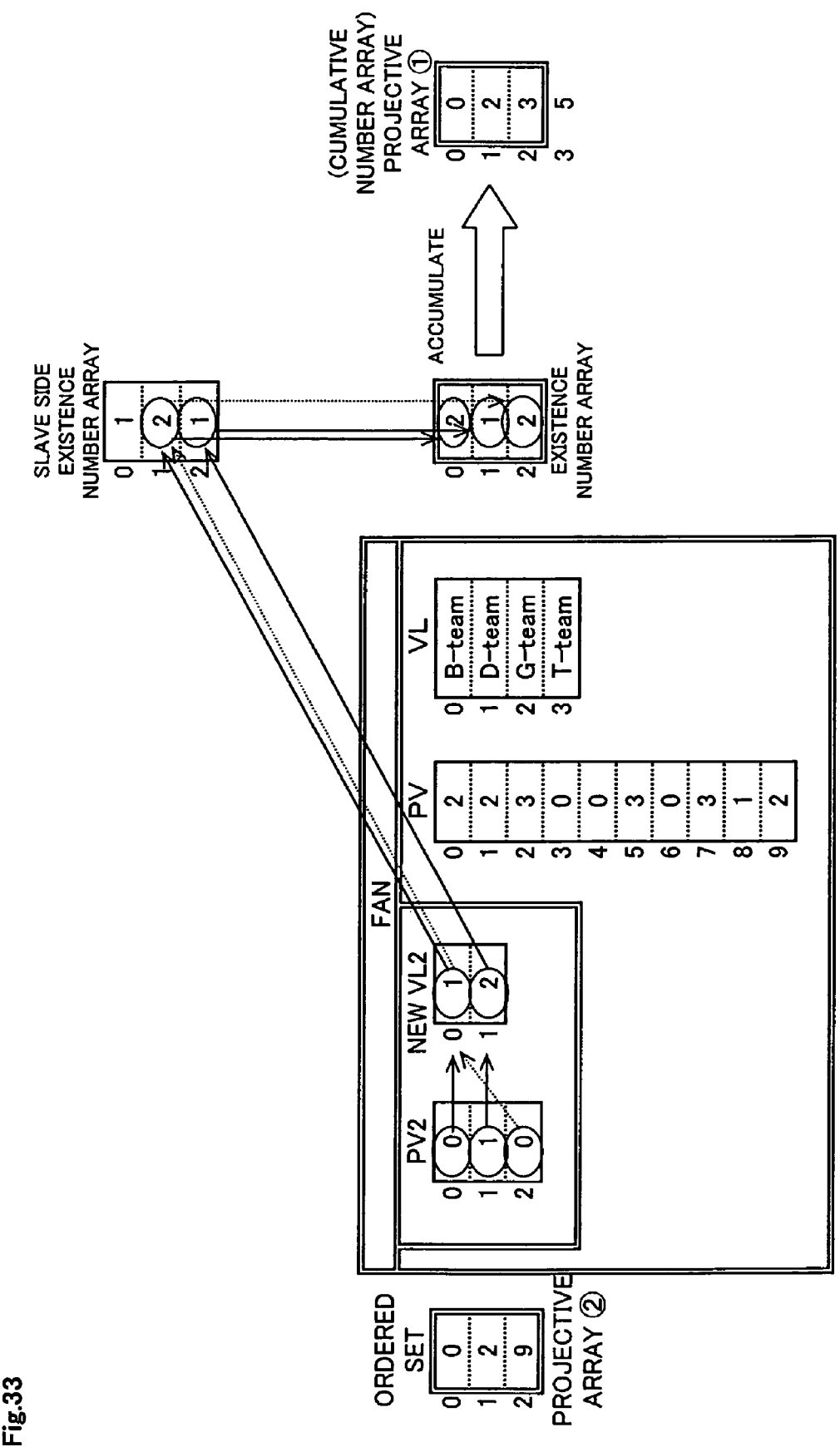
FIG. 33 is a view for explaining the join processing of the embodiment.

As shown in FIG. 33, a value of the new second value list (new VL2) specified by the head element "0" of the master side second pointer array (PV2) is "1". By using this, when reference is made to the slave side existence number array, an element at the position indicated by the value "1" becomes "2". Accordingly, "2" is arranged as the head element of the existence number array. Besides, a value of the new second value list (new VL2) specified by the second element "1" of the master side second pointer array (PV2) is "2". When reference is made to the slave side existence number array by using this, an element at the position indicated by the value "2" becomes "1". Accordingly, "1" is arranged as the second element of the existence number array. Similarly, a value of the new second value list (new VL2) specified by the third element "0" of the master side second pointer array (PV2) is "1". When reference is made to the slave side existence number array by using this, an element at the position indicated by the value "1" becomes "2". Accordingly, "2" is arranged as the third element of the existence number array.

Figure 34:
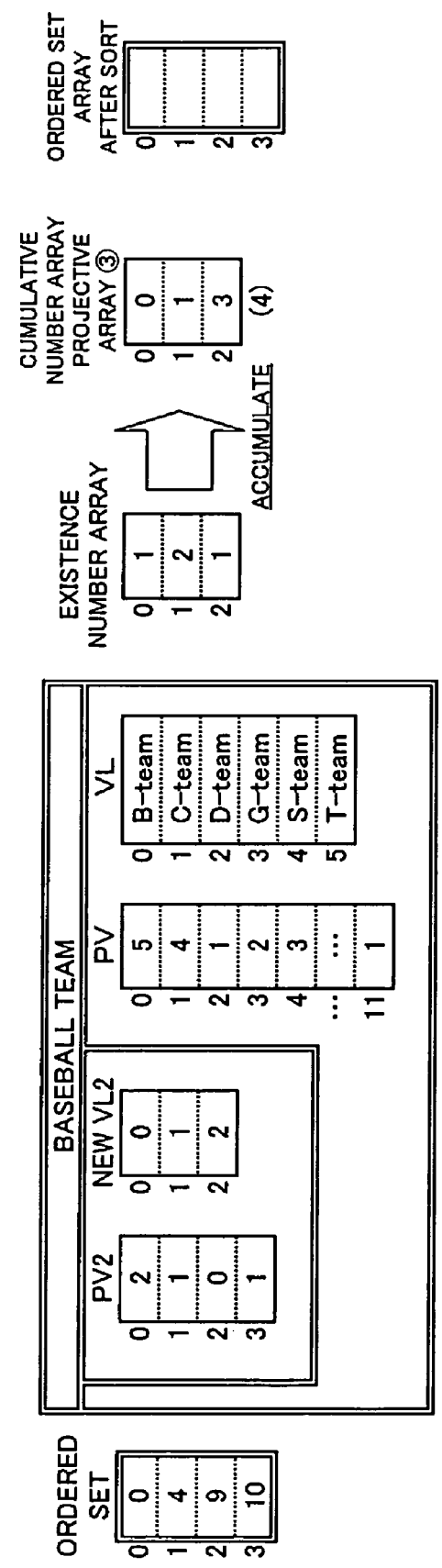
FIG. 34 is a view for explaining the join processing of the embodiment.

Next, based on the master side existence number array, the cumulative number array is created. The master side cumulative number array is referred to as "projective array (1)" in some cases. A value "5" arranged at the fourth position indicates the number of all records in the joined table. Besides, as shown in FIG. 34, based on the slave side existence number array, the cumulative number array is created. The slave side cumulative number array is referred to as "projective array (3)" in some cases. Further, the master side ordered set is referred to as "projective array (2)" in some cases.

Figure 35:
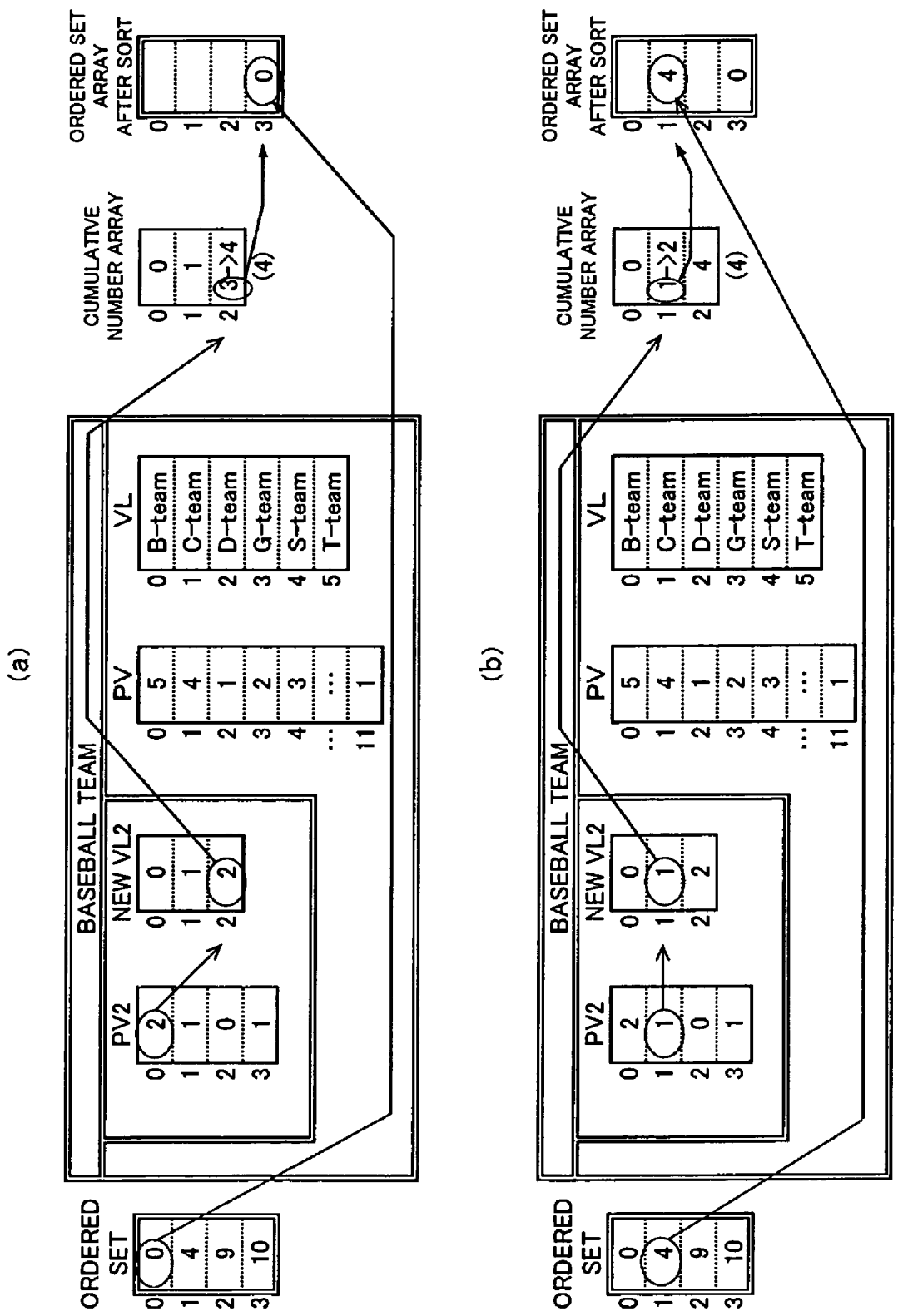
FIG. 35 is a view for explaining the join processing of the embodiment.
Figure 36:
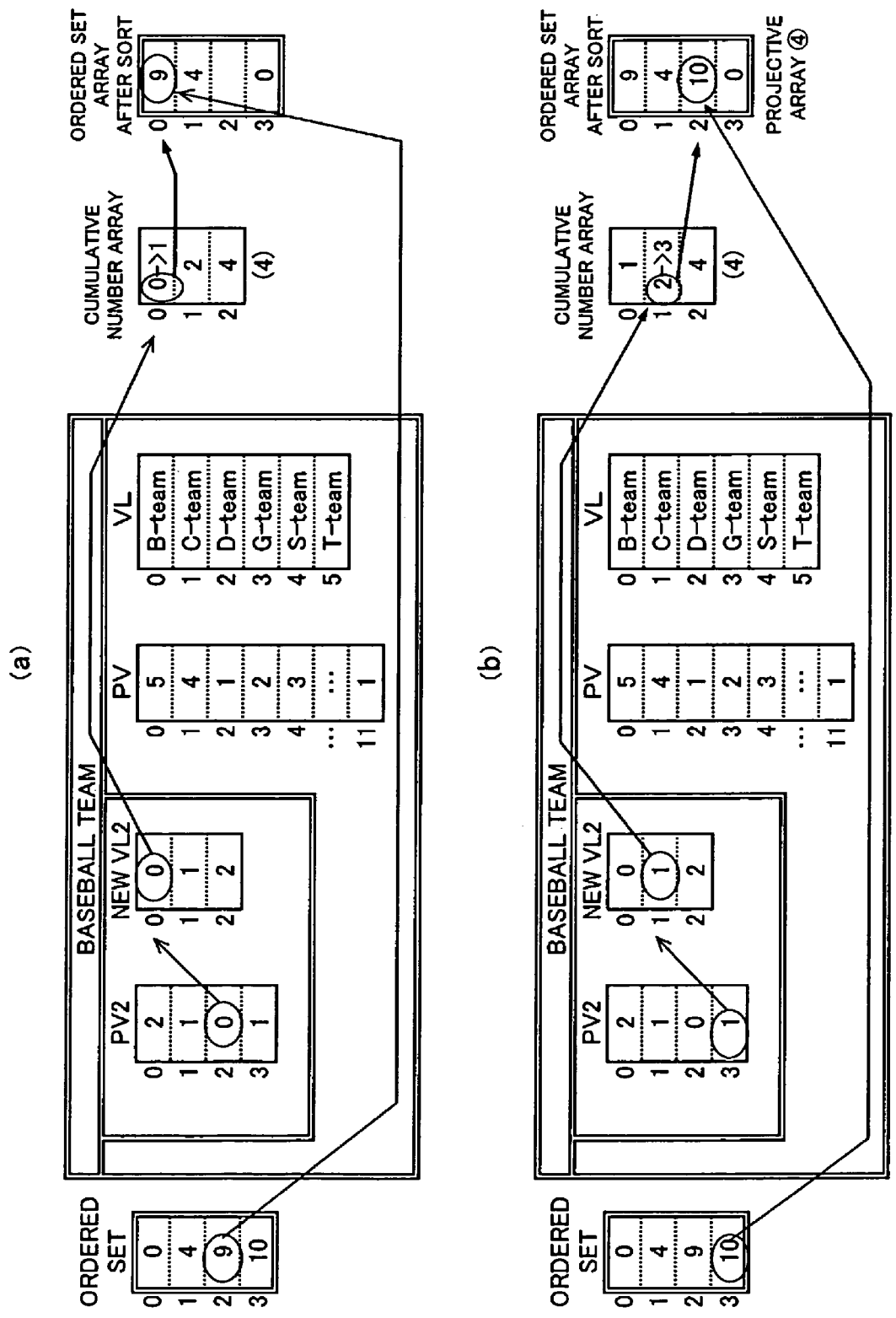
FIG. 36 is a view for explaining the join processing of the embodiment.

As stated above, after various existence number arrays and cumulative number arrays are created, the ordered set in which the slave side record numbers are arranged is sorted (step 2403). The sort of the ordered set will be described in more detail with reference to FIGS. 35 and 36. An element (that is, a record number) is extracted from the slave side ordered set (that is, the set having slave side record numbers), and subsequently, an element (in FIG. 35(a), "2") of the second pointer array (PV2) indicated by the element (in FIG. 35(a), "0") is specified. Further, a value (in FIG. 35(a), "2") of the new second value list (new VL2) indicated by the element of the PV2 is specified. Next, in the cumulative number array, a value (cumulative number) (in FIG. 35(a), "3") at the position indicated by the value of the new VL2 is extracted, and the element (record number) of the ordered set is arranged in the array of the ordered set after the sort at a position indicated by the cumulative number. Thereafter, the cumulative number is incremented (for example, in FIG. 35(a), from "3" to "4").

As shown in FIG. 35(b), also with respect to the second element "4" of the array of the ordered set, similarly, a second (storage position number "1") element (cumulative number) "1" is specified in the cumulative number array through the second pointer array (PV2) and the new second value list (new VL2). Accordingly, in the array of the ordered set after the sort, the element "4" of the array of the original ordered set is arranged at the position indicated by the cumulative number "1". Thereafter, the cumulative number is incremented from "1" to "2".

Similarly, as shown in FIG. 36(a), with respect to the third element "9" of the array of the ordered set, a first (storage position number "0") element (cumulative number) "0" is specified in the cumulative number array through the second pointer array (PV2) and the new second value list (new VL2). Accordingly, in the array of the ordered set after the sort, the element "9" of the array of the original ordered set is arranged at the position indicated by the cumulative number "0", and then, the cumulative number is incremented from "0" to "1". Further, as shown in FIG. 36(b), with respect to the fourth element "10" of the array of the ordered set, a second (storage position number "1") element (cumulative number) "2" is specified in the cumulative number array through the second pointer array (PV2) and the new second value list (new VL2). Accordingly, in the array of the ordered set after the sort, the element "10" of the array of the original ordered set is arranged at the position indicated by the cumulative number "2", and then, the cumulative number is incremented from "2" to "3". In this way, the sort of the slave side record numbers is completed.

Next, record numbers of the master side table and the slave side table corresponding to the record number of the joined table are calculated. The total number (number of records) of the record numbers of the joined table is coincident with a value arranged at the end of the cumulative number of the master side cumulative number array (projective array (1)). Accordingly, in the example explained with reference to FIGS. 31 to 36, the number of records becomes "5".

Figure 37:
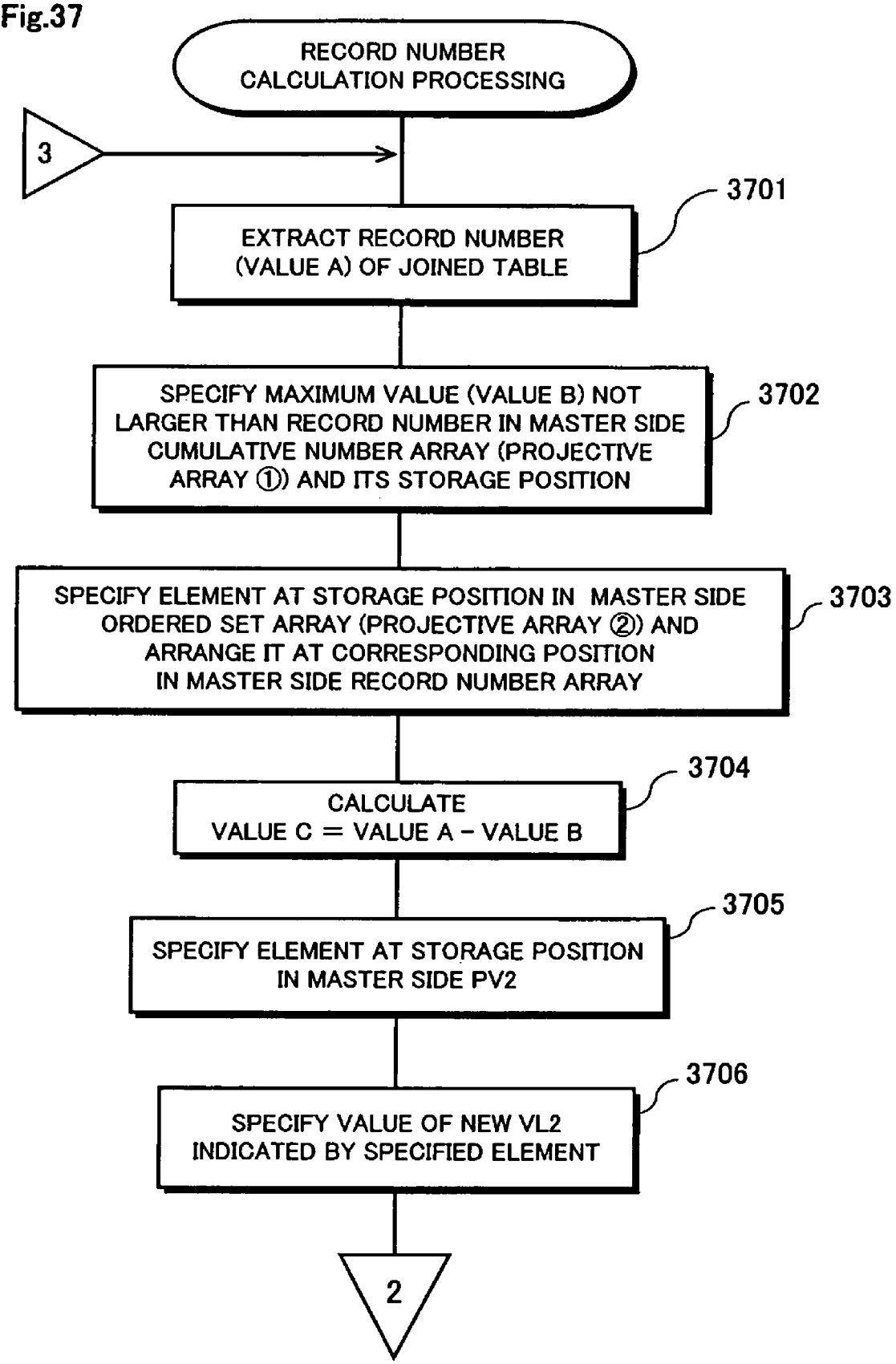
FIG. 37 is a flowchart showing a record number calculation processing in the join processing of the embodiment.
Figure 38:
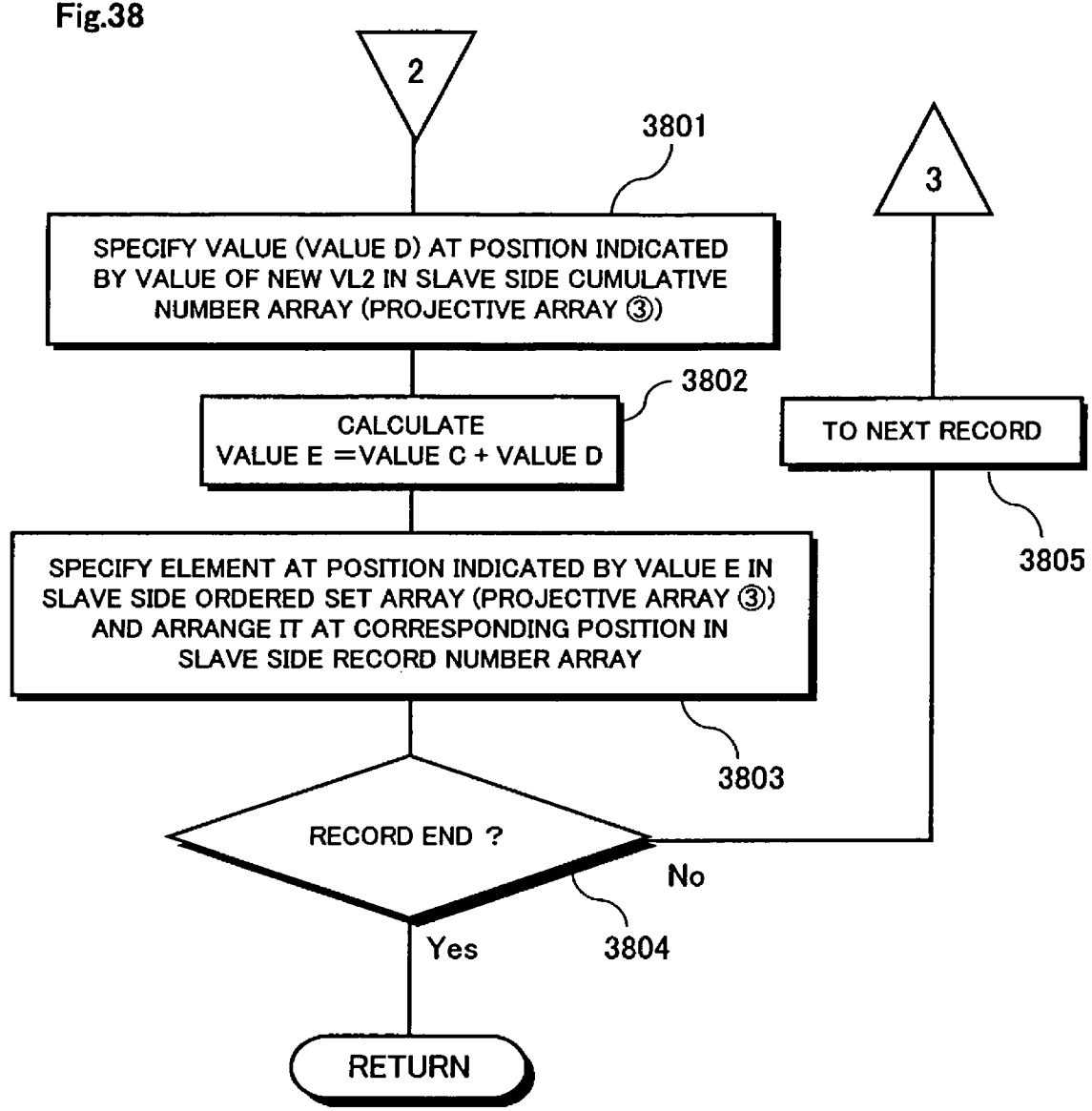
FIG. 38 is a view for explaining the record calculation processing of the embodiment.
Figure 39:
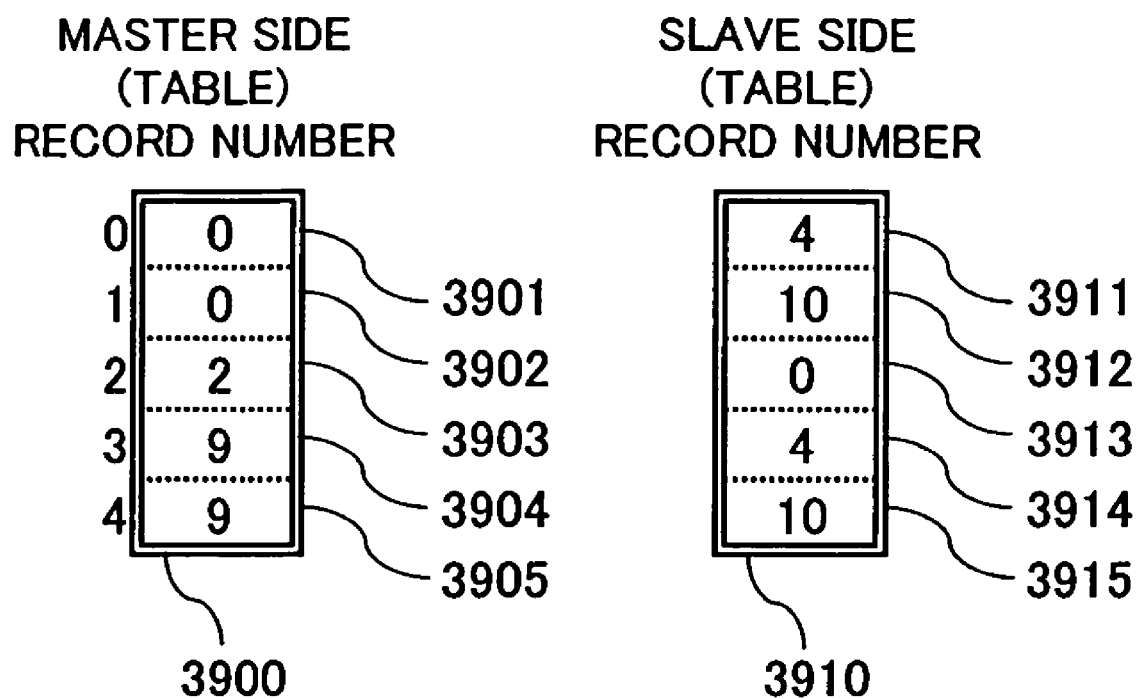
FIG. 39 is a view for explaining the record calculation processing of the embodiment.

FIGS. 37 and 38 are flowcharts showing processings (record number calculation processings) to calculate the corresponding master side and slave side record numbers from the record number of the joined table. Besides, FIG. 39 is a view showing a master side record number array and a slave side record number array obtained by performing the processings shown in FIGS. 37 and 38 with respect to the example shown in FIGS. 33 to 36.

Hereinafter, the record number calculation processing will be described in detail while using the projective arrays obtained in FIGS. 33 to 36 and using the case of acquiring the arrays of the record number shown in FIG. 39 as an example.

Figure 40:
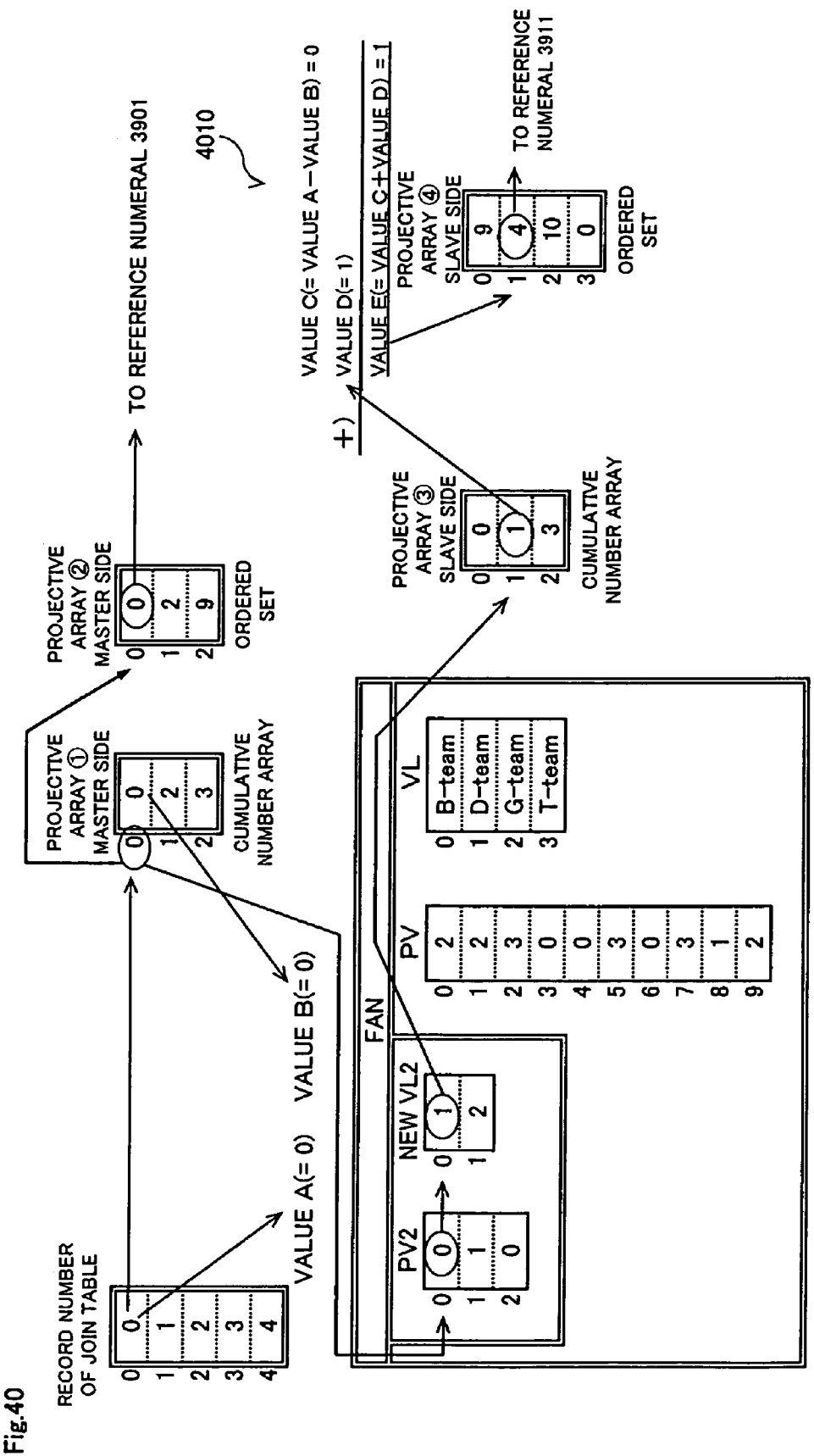
FIG. 40 is a view for explaining the record calculation processing of the embodiment.

First, a record number of the joined table is extracted (step 3701). This record number is referred to as a "value A" in the record number calculation processing. Initially, as shown in FIG. 40, a head element "0" is extracted from the record number array of the join table.

Next, in the master side cumulative number array (projective array (1)), a maximum value not larger than the element (record number) extracted at step 3701 and its storage position are specified (step 3702). This maximum value is referred to as a "value B" in the record number calculation processing. In the example of FIG. 40, in the projective array (1), since the maximum value not larger than the record number "0" is "0", the "value B" is "0", and its storage position is specified to be "0".

Thereafter, in the master side ordered set array (projective array (2)), an element (master side record number) of the storage position is specified, and this element (record number) is arranged in the master side record number array at a position corresponding to the storage position in the join table (step 3703). In the example of FIG. 40, in the projective array (2), the value "0" at the storage position "0", that is, the head value is extracted, and this is stored as the head element of the master side record number array as shown in FIG. 39 (see reference numeral 3901). In this way, the master side record number corresponding to the record number of the join table is calculated.

Next, a difference between the "value A" and the "value B" is taken (step 3704). In the record number calculation processing, this difference value is referred to as a "value C". In the example of FIG. 40, "value C=0" (see 4010).

Besides, in the master side second value list (PV2), the element at the storage position specified at step 3702 is specified (step 3705), and further, a value in the new second value list (new VL2) at a position indicated by the element of the VL2 is specified (step 3706). In the example of FIG. 40, in the PV2, an element "0" at the storage position "0" is specified, and next, in the new VL2, a value "1" at the storage position "0" is extracted.

Further, in the slave side cumulative number array (projective array (3)), an element at a position indicated by a value of the new second value list (new VL2) is specified (step 3801). This element is referred to as a "value D" in the record number calculation processing. In the example of FIG. 40, in the projective array (3), the element (cumulative number) "1" at the position indicated by the value "1" of the new VL2 is specified as the value D.

Thereafter, the "value C" and the "value D" are added (step 3802). In the record number calculation processing, the addition value is referred to as a "value E". In the example of FIG. 40, "value E=0+1=1".

Next, in the slave side ordered set array (projective array (4)), an element (slave side record number) at a position indicated by the "value E" is specified, and this element (record number) is arranged in the slave side record number array at a position corresponding to the storage position in the join table (step 3803). In the example of FIG. 40, a value "4" at the position corresponding to "1" of the projective array (4) is extracted, and this is stored as the head element of the slave side record number array shown in FIG. 39 (see step 3911).

The processing of step 3701 to step 3803 is successively performed on each of the record numbers of the join table (see steps 3804 and 3805), so that the master side and the slave side record numbers corresponding to the respective record numbers of the join table are calculated, and the respective record numbers are arranged at the corresponding positions of the record number array.

FIGS. 41 to 44 are views for respectively explaining processes to calculate the master side and the slave side record numbers from the second (storage position number "1") to the fifth (storage position number "4") record numbers in the record number array of the join table.

Figure 41:
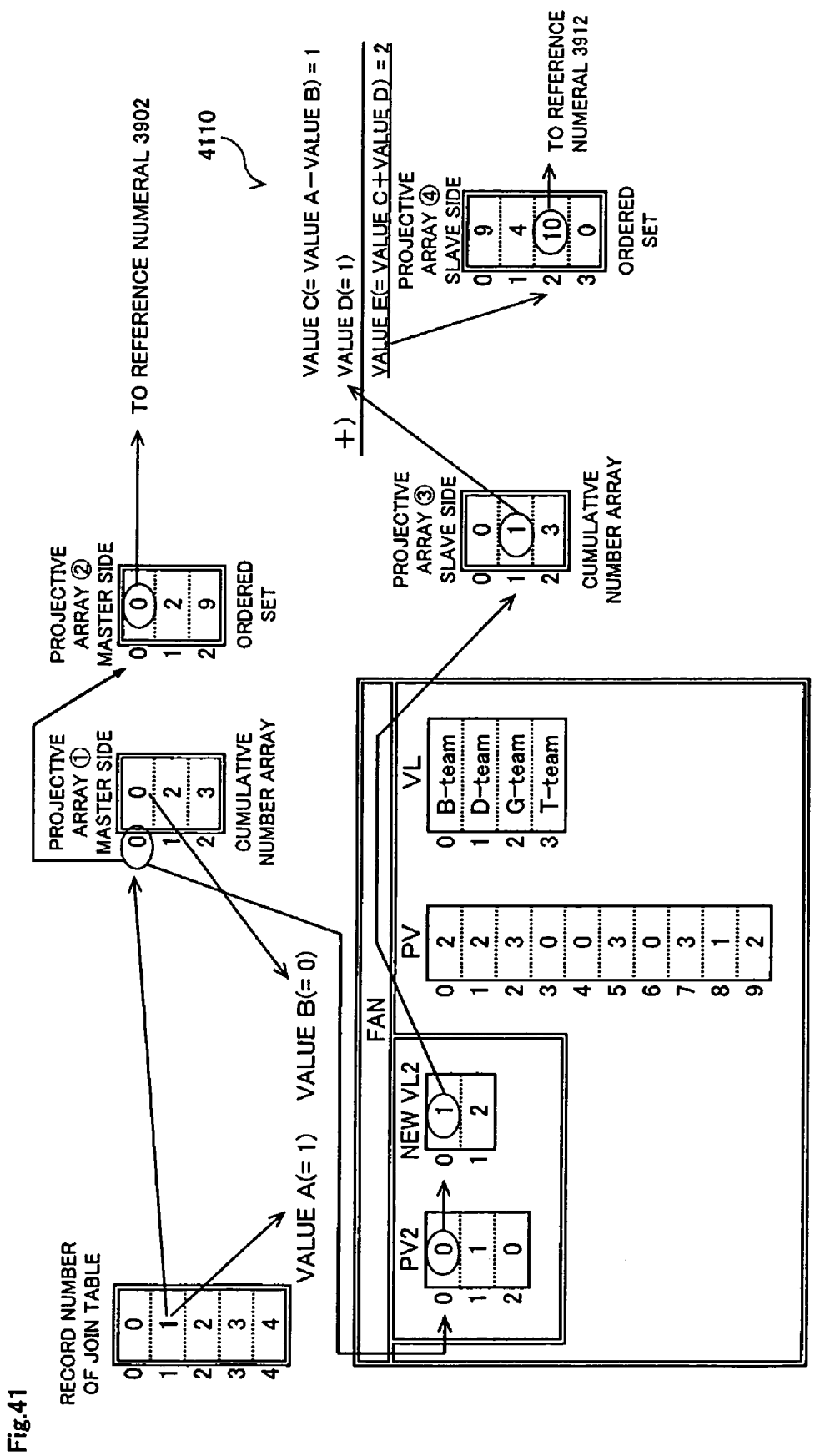
FIG. 41 is a view for explaining the record calculation processing of the embodiment.

In FIG. 41, an element (record number) of the record number array of the join table is "1", and in the projective array (1), a maximum value "0" not larger than "1" and its storage position "0" are specified (steps 3701 and 3702). In the projective array (2), an element "0" at a position indicated by the storage position "0" becomes a master side record number and is stored at a corresponding position in the master side record number array (see steps 3703 and 3902). Besides, "value C=1−0=1" is calculated (step 3704).

On the other hand, an element "0" at the storage position "0" in the master side PV2, and a value "1" in the new VL2 at a position indicated by the element "0" of the PV2 are specified. Further, in the projective array (3), an element 3 (cumulative number) "1" indicated by the value "1" of the new VL2 is specified (steps 3705, 3706 and 3801). Next, "value E=1+1=2" is calculated (step 3802), and in the projective array (2), an element (record number) "10" at the storage position "2" is extracted and is stored at a corresponding position in the slave side record number array (see step 3803 and reference numeral 3912).

Figure 42:
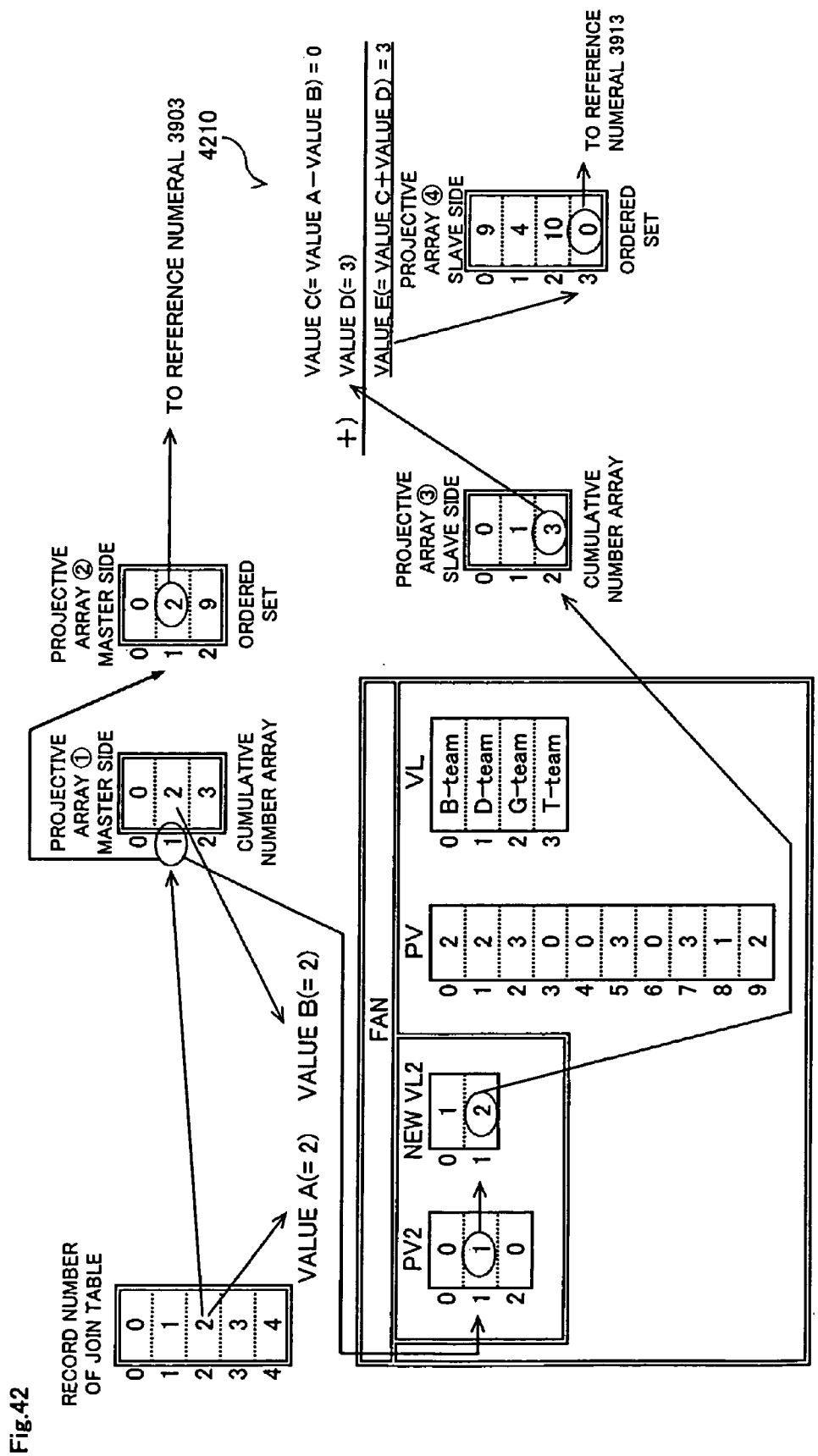
FIG. 42 is a view for explaining the record calculation processing of the embodiment.

In FIG. 42, an element (record number) of the record number array of the join table is "2", and in the projective array (1), a maximum value "2" not larger than "2" and its storage position "1" are specified (steps 3701 and 3702). In the projective array (2), the element "2" at the position indicated by the storage position "1" becomes the master side record number and is stored at a corresponding position in the master side record number array (see step 3703 and reference numeral 3903). Besides, "value C=2−2=0" is calculated (step 3704).

On the other hand, an element "1" at a storage position "1" in the master side PV 2, and a value "2" in the new VL2 at a position indicated by the element "1" of the PV2 are specified. Further, in the projective array (3), an element (cumulative number) indicated by the value "2" of the new VL2 is specified (steps 3705, 3706 and 3801). Next, "value E=0+3=3" is calculated (step 3802), and in the projective array (2), an element (record number) "0" at the storage position "3" is extracted and is stored at a corresponding position in the slave side record number array (see step 3803 and reference numeral 3913).

Figure 43:
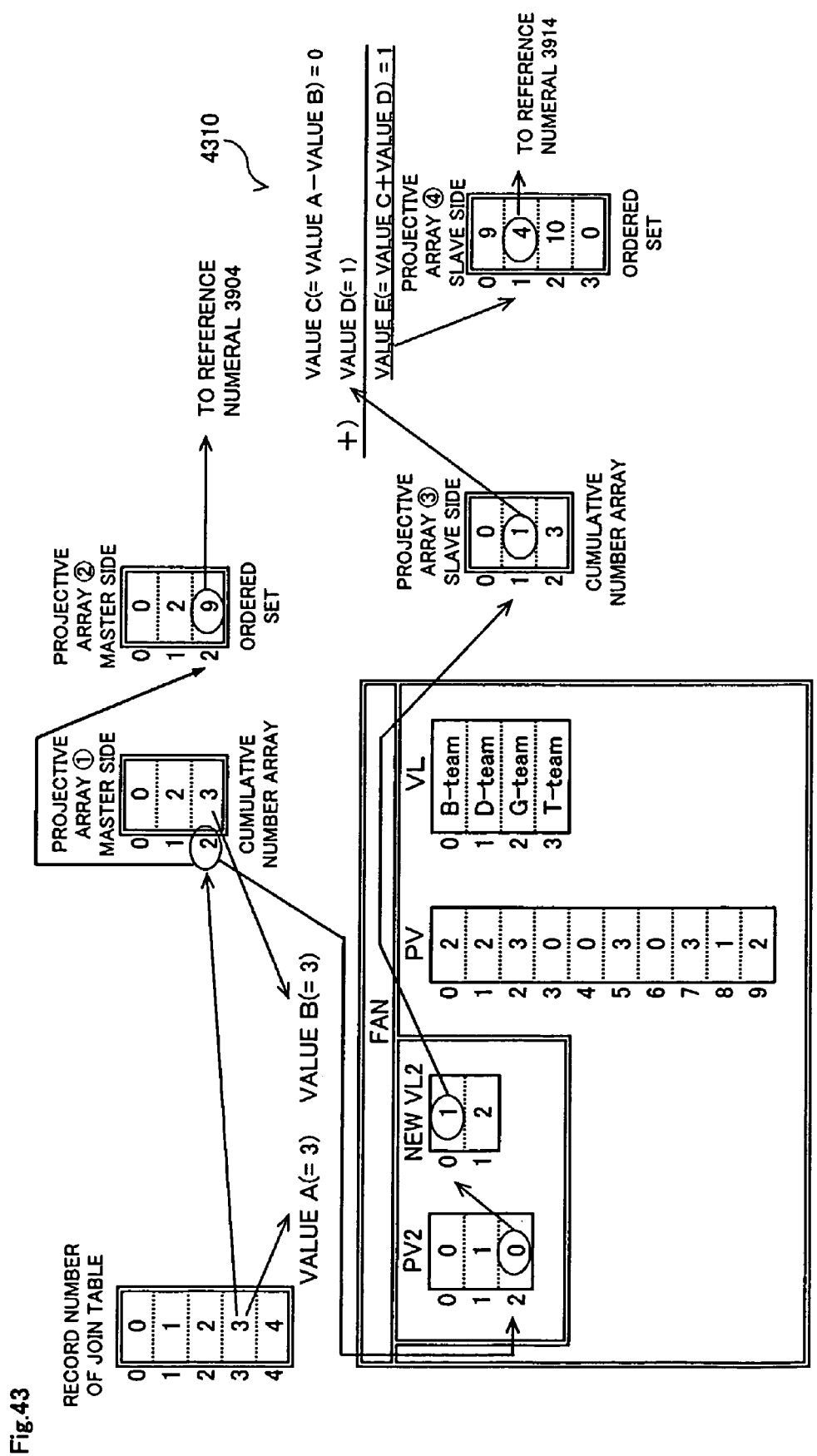
FIG. 43 is a view for explaining the record calculation processing of the embodiment.

Similarly, in FIG. 43, an element (record number) of the record number array of the join table is "3", and in the projective array (1), a maximum value "3" not larger than "3" and its storage position "2" are specified (steps 3701 and 3702). In the projective array (2), an element "9" at a position indicated by the storage position "2" becomes a master side record number and is stored at a corresponding position in the master side record number array (see step 3703 and reference numeral 3904). Besides, "value C=3−3=0" is calculated (step 3704).

On the other hand, an element "0" at a storage position "2" in the master side PV2, and a value "1" in the new VL2 at a position indicated by the element "0" of the PV2 are specified, and further, in the projective array (3), an element (cumulative number) "1" indicated by the value "1" of the new VL2 is specified (steps 3705, 3706 and 3801). Next, "value E=0+1=1" is calculated (step 3802), and in the projective array (2), an element (record number) "4" at the storage position "1" is extracted and is stored at a corresponding position in the slave side record number array (see step 3803 and reference numeral 3914).

Figure 44:
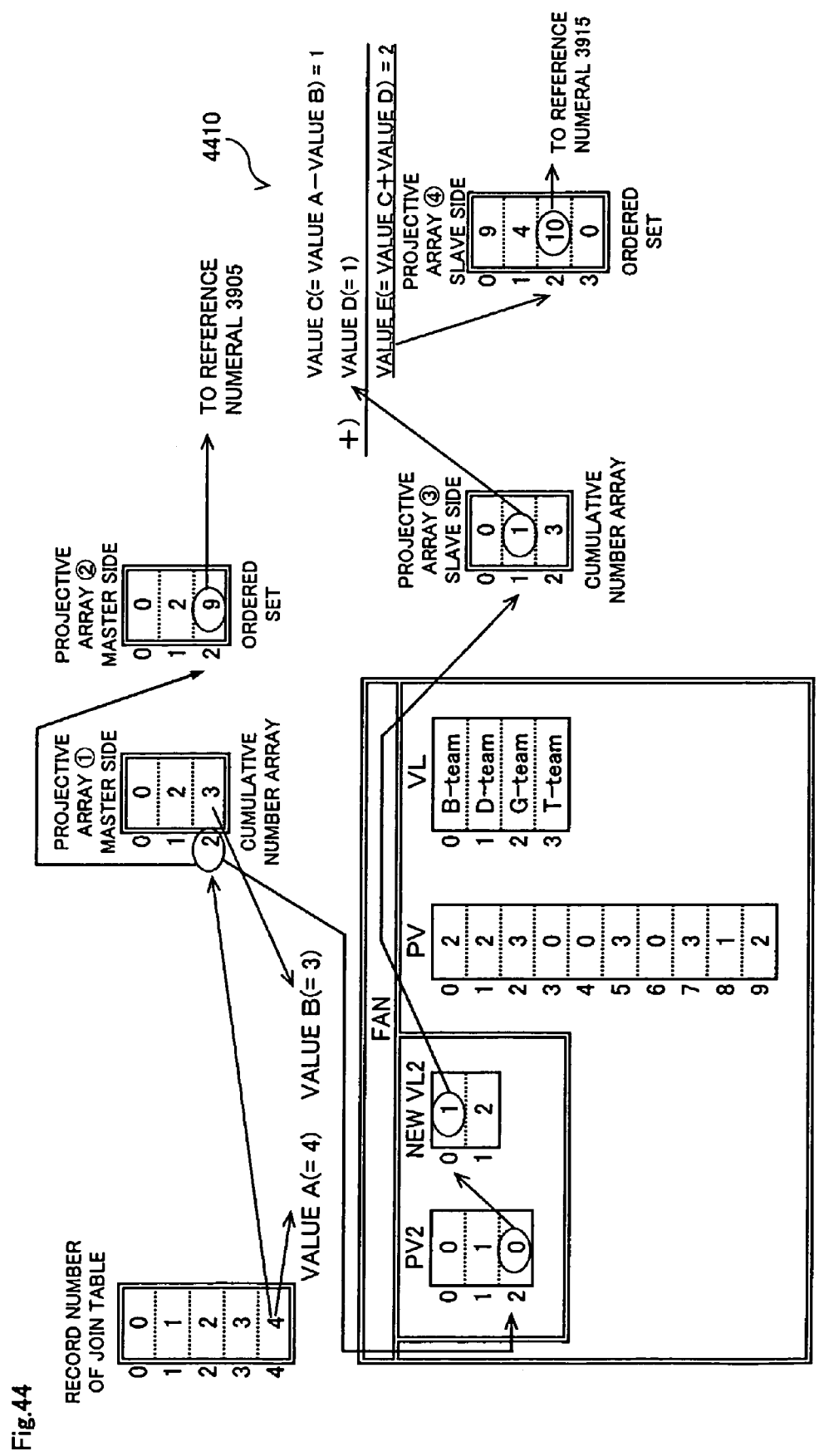
FIG. 44 is a view for explaining the record calculation processing of the embodiment.

Further, in FIG. 44, an element (record number) of the record number array of the join table is "4", and in the projective array (1), a maximum value "3" not larger than "4" and its storage position "2" are specified (steps 3701 and 3702). In the projective array (2), an element "9" at a position indicated by the storage position "2" becomes a master side record number and is stored at a corresponding position in the master side record number array (see step 3703 and reference numeral 3905). Besides, "value C=4−3=1" is calculated (step 3704).

On the other hand, an element "0" at the storage position "2" in the master side PV2, and a value "1" in the new VL2 at a position indicated by the element "0" of the PV2 are specified, and further, in the projective array (3), an element (cumulative number) "1" indicated by the value "1" of the new VL2 is specified (steps 3705, 3706 and 3801). Next, "value E=1+1=2" is calculated (step 3802), and in the projective array (2), an element (record number) "10" at the storage position "2" is extracted and is stored at a corresponding position in the slave side record number array (see step 3803 and reference numeral 3915).

Figure 45:
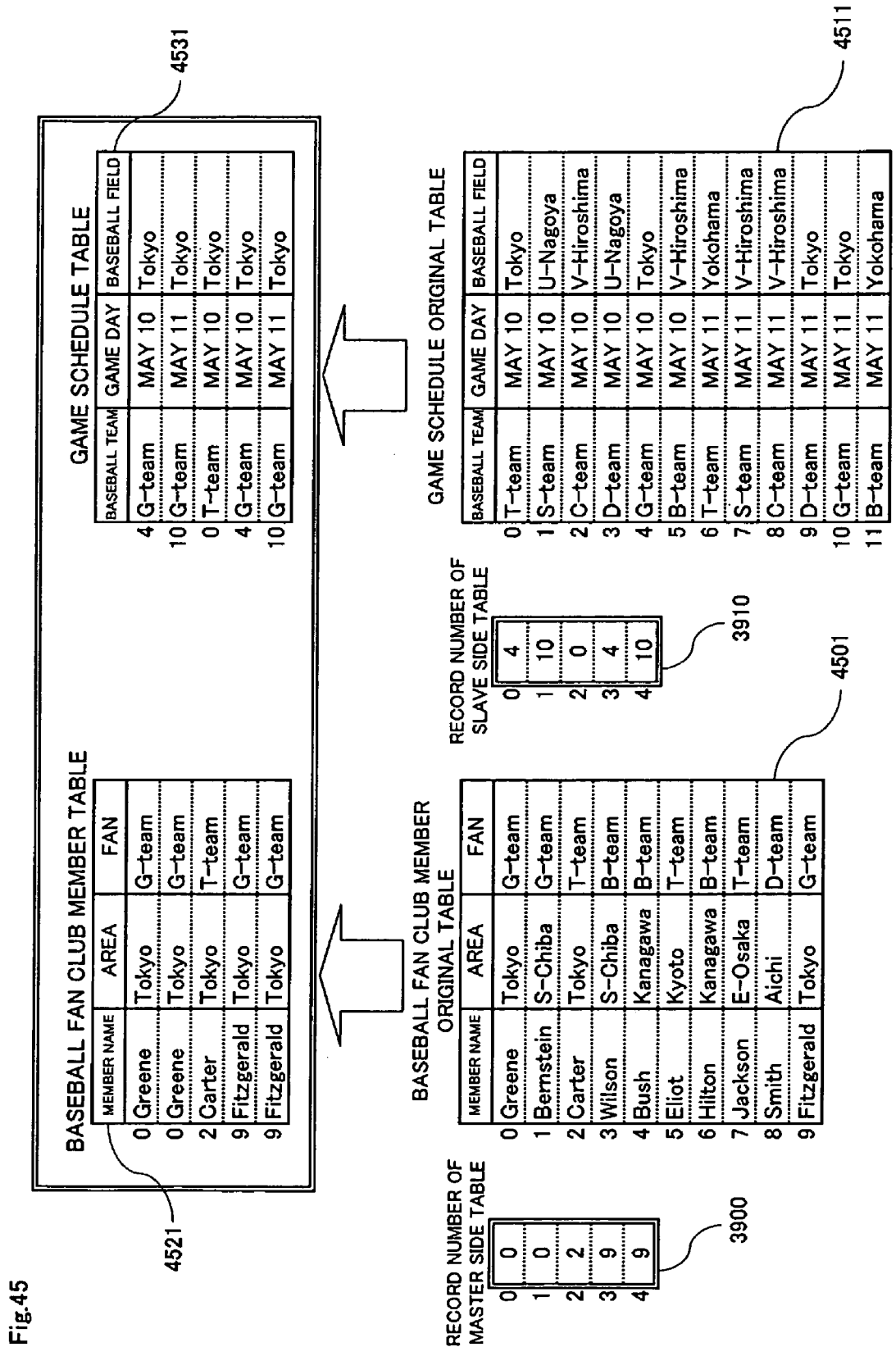
FIG. 45 is a view showing a table (view) finally obtained by the join processing of the embodiment.

FIG. 45 is a view showing the record number array of the master side table and the record number array of the slave side table obtained as a result of the processing, the joined view and the like. In accordance with a record number array 3900 (record number therein) of the master side table, a record is extracted from the master original table (baseball fan club member original table 4501), so that a table (baseball fan club member table 4521) is obtained in which the order of the original table is kept. On the other hand, in accordance with a record number array 3910 (record number therein) of the slave side table, a record is extracted from the slave side original table (game schedule original table 4511), so that a table (game schedule table 4531) can be obtained which is made to correspond to the master side record.

As stated above, according to this embodiment, also in the processing of the join, each of the projective arrays can be made the same as the second value list. Besides, the shared value list (shared new value list) is limited to, at the most, a size obtained by adding the master side second value list and the slave side second value list. Accordingly, it becomes possible to shorten the processing time when the element in the projective array is specified or the value of the second value list is specified.

The invention is not limited to the above embodiment, and various modifications can be made within the scope of the invention recited in the claims, and it is needless to say that they are also included in the scope of the invention.

For example, in the embodiment, as the aggregation processing, although the description has been given to the case where the existence number array is created, and the element in the existence number array is extracted, the invention is not limited to this. In general, aggregation is basically divided into "plural dimensions of 0 or more" and "measure of 0 or 1". For example, when consideration is given to "gender×average value of weight for each weight", the dimension is "two dimensions" ("gender" and "weight"), and the measure is "weight", In the case where the measure is lion, the number of elements becomes a value (aggregation value) obtained by aggregation. In this case, an element in the existence number array becomes an aggregation value. In addition, the total, maximum, minimum, average or the like can be taken as the measure.

As the dimension, various classifications are possible. For example, in ages, 0 to nine years old are made less than ten years old and can be made one category. Here, a classification number array having the same number of elements as the value list is prepared, and in the classification number array, "0" is arranged as an element at a position corresponding to a value (age) "0" to "9" of the value list, and "1" is arranged as another element. Of course, basically, one category can be assigned to each value which can be distinguished. That is, in ages, in the classification number array, for example, values of "0", "1", "2", . . . can be arranged in an ascending order. In the aggregation, a set having record numbers relevant to a certain classification number is acquired, and a predetermined operation may be performed for a value specified from the record number. By this, it becomes possible to obtain various aggregation values such as total, maximum and minimum. Also in this embodiment, the classification number array having the same size as the second value list is provided, and when a value corresponding to a category is assigned thereto, various aggregation values can be acquired.

Besides, in the embodiment, the second pointer array and the second value list are created, so that the size of the array used for retrieval, aggregation, sort, join and the like is compressed, and by this, a required memory area is reduced, and the processing time is shortened. However, no limitation is made to this, and an item value number array created at an intermediate stage where the second pointer array and the second value list are created may be used. In this case, instead of the second pointer array (PV2), the item value number array may be used, and instead of the second value list (VL2), the original value list (VL) may be used. That is, in the above embodiment, for example, in order to specify the item value in the value list, the elements are specified in the order of the element in the ordered set array, the element in the second pointer array, the element in the second value list, and the element (item value) in the value list. On the other hand, in a modified example, elements may be specified in the order of the element in the ordered set array, the element in the item value number array, and the element (item value) in the value list.

Besides, also in the processing of retrieval, aggregation, sort, join and the like, as an array in which reference is made to a value, instead of the second pointer array, the item value number array may be used, and instead of the second value list, the original value list may be used.

Further, in the above embodiment, the predetermined program is read into the general computer system 10, and the program is executed, so that the join of plural tabular format data and the processing relating to the joined tabular format data is realized. However, the invention is not limited to this, and it is needless to say that a structure may be adopted such that a board computer dedicated for database processing is connected to a general computer system such as a personal computer, and the board computer can execute the processing. Accordingly, in the present specification, means does not necessarily imply a physical means, but includes a case where the functions of the respective means are realized by software and/or hardware. Further, the function of one means may be realized by two or more physical means, or the function of two or more means may be realized by one physical means.

According to the invention, it becomes possible to provide the method in which the array is made to coincide with the size of a subset and the size of a subset of a value list limited in accordance with this, and the shortening of the processing time corresponding to the size of the subset is realized.

INDUSTRIAL APPLICABILITY

The invention can be used for a system managing a large amount of data, for example, a database or a data warehouse. More specifically, it can be used for large scientific computation, basic business management such as accepting and ordering management or stock transaction, and office management.

The invention claimed is:

1. A data processing method for extracting a subset from tabular format data viewed as an array of records, each record including item values belonging to items, the method comprising the steps of:

(a) constructing the tabular format data by creating information blocks corresponding to respective items, each information block including a first value list in which the item values are stored in order of item value numbers corresponding to the item values and a first pointer array in which pointer values indicating the item value numbers are stored in order of unique record numbers;

(b) creating an ordered set array containing record numbers of records selected from the array of the records, wherein the selected record numbers are arranged in a specified order in the ordered set array;

(c) comparing a size of the ordered set array with a size of the first value list, wherein, as a result of the comparison, when size of the ordered set array is smaller than the size of the first value list at a predetermined rate, then steps (d) and (e), are performed;

(d) arranging a pointer value in the first pointer array at a position indicated by each of the record numbers of the ordered set array into an item value number array at a position corresponding to a position where the record number is arranged in the ordered set array; and (e) creating a second value list storing value elements contained in the item value number array and a second pointer array storing position elements indicating elements in the second value list corresponding to the record numbers by referring to the item value number array, wherein a value in the first value list is specified from a record number of the ordered set array through a first element in the second pointer array at a position indicated by the record number and a second element in the second value list at a position indicated by the first element in the second pointer array.

2. A retrieval method using the second pointer array and the second value list created by the data processing method according to claim 1, wherein the retrieval method comprises the steps of:

specifying an element indicating an item value as a retrieval object among elements in the second value list;

arraying a value indicating that a flag is on at a position corresponding to a position of the specified element in a flag array having the same size as the second value list;

specifying an element of the second pointer array indicated by a record number in the ordered set;

referring to a state of a flag at a position indicated by an element of the second pointer array in the flag array; and successively arranging the record number into a newly provided ordered set array for output in a case where the state of the flag is on.

3. An aggregation method using the second value list created by the data processing method according to claim 1, wherein the method comprises the steps of:

creating a classification number array in which a classification number indicating a category of a value is arranged correspondingly to an element of the second value list;

specifying a record number in the ordered set array corresponding to the specified classification number; and performing aggregation using a predetermined value list item value indicated by the specified record number.

4. A sort method using the second pointer array and the second value list created by the data processing method according to claim 1, wherein the sort method comprises the steps of:

calculating an existence number as the number of elements indicated by the second pointer array for each value of the second value list;

creating, based on the existence number, a cumulative number array corresponding to a value of the second value list and indicating a head position at which a record number in the ordered set array is to be arranged; and referring to the cumulative array and arranging a record number of the ordered set array into an array for output so that a sort order of the item values in the value list is reflected.

5. A method of joining tabular format data by using the second pointer array and the second value list in the information block relating to each of plural tabular format data created by the data processing method according to claim 1, wherein the method of joining tabular format data comprises the steps of:

finding an item to be shared in each of the plural tabular format data;

equating item values in the second value list of the information block relating to the item; and in response to equating the item values, updating an element in the second pointer array in each of the information blocks in accordance with a change in arrangement of the item values.

6. A data processing program stored in memory of a computer and operating the computer to extract a subset from tabular format data viewed as an array of records, each record including item values belonging to items, wherein the data processing program causes the computer to execute the steps of:

(a) constructing the tabular format data by creating information blocks corresponding to respective items, each information block including a first value list in which the item values are stored in order of item value numbers corresponding to the item values and a first pointer array in which pointer values indicating the item value numbers are stored in order of unique record numbers;

(b) creating an ordered set array containing record numbers of records selected from the array of the records, wherein the selected record numbers are arranged in a specified order in the ordered set array;

(c) comparing a size of the ordered set array with a size of the first value list, wherein, as a result of the comparison, when size of the ordered set array is smaller than the size of the first value list at a predetermined rate, then the program makes the computer execute steps (d) and (e);

(d) arranging a pointer value in the first pointer array at a position indicated by each of the record numbers of the ordered set array into an item value number array at a position corresponding to a position where the record number is arranged in the ordered set array; and (e) creating a second value list storing value elements contained in the item value number array and a second pointer array storing position elements indicating elements in the second value list corresponding to the record numbers by referring to the item value number array, wherein the computer operates so that a value in the first value list is specified from a record number of the ordered set array through a first element in the second pointer array at a position indicated by the record number and a second element in the second value list at a position indicated by the first element in the second pointer array.

7. A data processing method for extracting a subset from tabular format data viewed as an array of records, each record including item values belonging to items, the method comprising the steps of:

(a) constructing the tabular format data by creating information blocks corresponding to respective items, each information block including a first value list in which the item values are stored in order of item value numbers corresponding to the item values and a first pointer array in which pointer values indicating the item value numbers are stored in order of unique record numbers;

(b) creating an ordered set array containing record numbers of records selected from the array of the records, wherein the selected record numbers are arranged in a specified order in the ordered set array;

(c) comparing a size of the ordered set array with a size of the first value list, wherein, as a result of the comparison, when size of the ordered set array is smaller than the size of the first value list at a predetermined rate, then steps (d) and (e), are performed;

(d) arranging a pointer value in the first pointer array at a position indicated by each of the record numbers of the ordered set array into an item value number array at a position corresponding to a position where the record number is arranged in the ordered set array; and (e) creating a second value list storing value elements contained in the item value number array and a second pointer array storing position elements indicating elements in the second value list corresponding to the record numbers by referring to the item value number array, wherein a value in the first value list is specified from a record number of the ordered set array through a first element in the second pointer array at a position indicated by the record number and a second element in the second value list at a position indicated by the first element in the second pointer array, wherein the step of creating the second value list and the step of creating the second pointer array include the steps of i. sorting elements in the item value number array;

ii. creating a third array in a state where a duplicate value is excluded, and substituting the created third array for the second value list; and iii. creating the second pointer array by converting the elements in the item value number array to reflect the sort of the elements in the item value number array and the exclusion of the duplicate value.

8. A data processing method for extracting a subset from tabular format data viewed as an array of records, each record including item values belonging to items, the method comprising the steps of:

(a) constructing the tabular format data by creating information blocks corresponding to respective items, each information block including a first value list in which the item values are stored in order of item value numbers corresponding to the item values and a first pointer array in which pointer values indicating the item value numbers are stored in order of unique record numbers;

(b) creating an ordered set array containing record numbers of records selected from the array of records, wherein the selected record numbers are arranged in a specified order in the ordered set array;

(c) comparing a size of the ordered set array with a size of the first value list, wherein, as a result of the comparison, when size of the ordered set array is smaller than the size of the first value list at a predetermined rate, then steps (d) and (e) are performed;

(d) arranging a pointer value in the first pointer array at a position indicated by each of the record numbers of the ordered set array into an item value number array at a position corresponding to a position where the record number is arranged in the ordered set array; and (e) specifying a value in the first value list from a record number of the ordered set array through an element in the item value number array at a position indicated by the record number.

9. A data processing program stored in memory of a computer and operating the computer to extract a subset from tabular format data viewed as an array of records, each record including item values belonging to items, wherein the data processing program causes the computer to execute the steps of:

(a) constructing the tabular format data by creating information blocks corresponding to respective items, each information block including a first value list in which the item values are stored in order of item value numbers corresponding to the item values and a first pointer array in which pointer values indicating the item value numbers are stored in order of unique record numbers;

(b) creating an ordered set array containing record numbers of records selected from the array of the records, wherein the selected record numbers are arranged in a specified order in the ordered set array;

(c) comparing a size of the ordered set array with a size of the first value list, wherein, as a result of the comparison, when size of the ordered set array is smaller than the size of the first value list at a predetermined rate, then the program makes the computer execute steps (d) and (e);

(d) arranging a pointer value in the first pointer array at a position indicated by each of the record numbers of the ordered set array into an item value number array at a position corresponding to a position where the record number is arranged in the ordered set array; and (e) creating a second value list storing value elements contained in the item value number array and a second pointer array storing position elements indicating elements in the second value list corresponding to the record numbers by referring to the item value number array, wherein the computer operates so that a value in the first value list is specified from a record number of the ordered set array through a first element in the second pointer array at a position indicated by the record number and a second element in the second value list at a position indicated by the first element in the second pointer array, and wherein when creating the second value list and the second pointer array, the computer is made to execute the steps of i. sorting the elements in the item value number array, creating a third array in a state where a duplicate value is excluded, and substituting the created third array for the second value list; and ii. creating the second pointer array by converting the elements in the item value number array to reflect the sort of the elements in the item value number array and the exclusion of the duplicate value.

10. A data processing program stored in memory of a computer and operating the computer to extract a subset from tabular format data viewed as an array of records, each record including item values belonging to items, wherein the data processing program causes the computer to execute the steps of:

(a) constructing the tabular format data by creating information blocks corresponding to respective items, each information block including a first value list in which the item values are stored in order of item value numbers corresponding to the item values and a first pointer array in which pointer values indicating the item value numbers are stored in order of unique record numbers;

(b) creating an ordered set array containing record numbers of records selected from the array of the records, wherein the selected record numbers are arranged in a specified order in the ordered set array;

(c) comparing a size of the ordered set array with a size of the first value list, wherein, as a result of the comparison, when the size of the ordered set array is smaller than the size of the first value list at a predetermined rate, the computer is made to execute the steps (d) and (e);

(d) arranging a pointer value in the first pointer array at a position indicated by each of the record numbers of the ordered set array into an item value number array at a position corresponding to a position where the record number is arranged in the ordered set array; and (e) the computer is operated to specify a value in the first value list from a record number of the ordered set array through an element in the item value number array at a position indicated by the record number.

* * * * *